(12) United States Patent
Kisoda et al.

(10) Patent No.: US 7,852,958 B2
(45) Date of Patent: Dec. 14, 2010

(54) RECEIVING APPARATUS, INTEGRATED CIRCUIT AND RECEIVING METHOD

(75) Inventors: Akira Kisoda, Osaka (JP); Ryosuke Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 583 days.

(21) Appl. No.: 11/915,992

(22) PCT Filed: May 29, 2006

(86) PCT No.: PCT/JP2006/310698
§ 371 (c)(1),
(2), (4) Date: Nov. 29, 2007

(87) PCT Pub. No.: WO2006/134769
PCT Pub. Date: Dec. 21, 2006

(65) Prior Publication Data
US 2009/0310479 A1  Dec. 17, 2009

(30) Foreign Application Priority Data
Jun. 14, 2005  (JP) ............................. 2005-173370

(51) Int. Cl.
*H04K 1/10* (2006.01)
*H04L 27/28* (2006.01)

(52) U.S. Cl. ...................... 375/260; 375/229; 375/346; 375/350; 370/203; 370/208; 370/210

(58) Field of Classification Search ................. 375/260, 375/229–236, 346–350
See application file for complete search history.

(56) References Cited

U.S. PATENT DOCUMENTS

| 5,307,376 A | 4/1994 | Castelain et al. |
| 6,204,809 B1 * | 3/2001 | Sezai ......................... 342/359 |

FOREIGN PATENT DOCUMENTS

| JP | 3044899 | 3/2000 |
| JP | 2002-64413 | 2/2002 |
| JP | 2003-101503 | 4/2003 |
| JP | 2003-110528 | 4/2003 |
| JP | 2003-218827 | 7/2003 |
| JP | 2004-266814 | 9/2004 |

* cited by examiner

OTHER PUBLICATIONS

International Search Report issued Aug. 15, 2006 in the International (PCT) Application of which the present application is the U.S. National Stage.

*Primary Examiner*—Curtis B Odom
(74) *Attorney, Agent, or Firm*—Wenderoth, Lind & Ponack, L.L.P.

(57) ABSTRACT

For a data group composed of pieces of data each indicating channel characteristics of a scattered pilot signal position whose phase is adjusted by dividing scattered pilot signals included in an OFDM signal by a scattered pilot signal at the time of transmission, a carrier extension circuit 341 inserts data having a same value as a value of data of a lower end into an outside of the lower end of a band, and inserts data having a same value as a value of data of an upper end into an outside of the upper end of the band. On the data group composed of $2^N$ pieces of data including the data inserted by the carrier extension circuit 341, IFFT processing by an IFFT circuit 342, noise removal processing by a noise removal filter 343, and FFT processing by a FFT circuit 344 are performed. The data inserted by the carrier extension circuit 341 is removed from the data group outputted from the FFT circuit 344, and the data group after the data removal is used for interpolation in a symbol direction.

11 Claims, 16 Drawing Sheets

| THRESHOLD VALUE OF NOISE REMOVAL (CODE RATE IS 1/2.) ||
|---|---|
| MAPPING | THRESHOLD VALUE |
| QPSK | −18dB |
| 16QAM | −26dB |
| 64QAM | −30dB |

RECEIVING APPARATUS, INTEGRATED CIRCUIT AND RECEIVING METHOD

TECHNICAL FIELD

The present invention relates to a receiver, an integrated circuit, and a receiving method that are used for digital broadcasting and the like in an OFDM (Orthogonal Frequency Division Multiplex) transmission system.

BACKGROUND ART

The OFDM transmission system is adopted in a digital terrestrial broadcasting system in Japan and Europe. In an ISDB-T (Integrated Services Digital Broadcasting-Terrestrial) system in Japan and a DVB-T (Digital Video Broadcasting-Terrestrial) system in Europe, both of which adopt the OFDM transmission system, pilot signals having a known amplitude and phase are scattered in a sub carrier for a frequency domain. These pilot signals are called scattered pilot signals (hereinafter, referred to as SP signal). Also, in Europe, a DVB-H (Digital Video Broadcast-Handheld) system based on the DVB-T system is standardized for a portable receiver. In the DVB-H system, pilot signals having a known amplitude and phase are scattered and inserted in a sub carrier for a frequency domain.

The following describes an arrangement of SP signals, with reference to FIG. 1. FIG. 1 shows the arrangement of the SP signals. The SP signals are not transmitted by each sub carrier, but are transmitted by a sub carrier in which a sub carrier index k satisfies k=3 (n mod 4)+12p, where n indicates a symbol index (mod indicates a modulus operator, and p is an integer). In detail, as shown in FIG. 1, the SP signals are repeated in a cycle of 4 symbols and shifted by 3 sub carriers for each symbol.

Each SP signal is transmitted after being modulated into a binary signal by a transmitter, based on a predetermined pattern determined according to a sub carrier position of the SP signal. A receiver adjusts a phase of the SP signal, and then performs interpolation in a time axis direction (symbol direction) and a frequency axis direction (carrier direction) using a LPF (Low Pass Filter) to estimate channel characteristics for all sub carriers. Then, the receiver performs complex division on data signals by the estimated channel characteristics, to obtain data signals that are equalized corresponding to an effect of a channel.

However, when noise is superimposed on a SP signal itself and a noise component is large, because the SP signal is used for estimating channel characteristics, an estimation error of the channel characteristics becomes large.

The following method can be used to solve the above problem.

After performing a FFT (Fast Fourier Transform) on a received OFDM signal, SP signals are extracted. Then, an IFFT (Inverse Fast Fourier Transform) is performed on the extracted SP signals to obtain a signal in a time domain, and a signal component of a predetermined duration of the signal after the IFFT is multiplied by a rectangular window. As a result, a noise component is removed from the SP signals (refer to a patent document 1, for example). Then, the FFT is performed on the signal after the noise removal, and interpolation processing and the like are performed to estimate channel characteristics for all of sub carriers.

Although an object is different from the above method, the following is a prior art that performs the similar processing as the above method.

SP signals are phase adjusted and interpolated in the symbol direction using the LPF, and the IFFT is performed on a data group in a same symbol after the interpolation. A portion of data of the data group after the IFFT is set to zero, and the FFT is performed on the data to obtain the channel characteristics of all of sub carrier positions (refer to patent documents 2 and 3, for example). The purpose of this prior art is to minimize the effect of a ripple (pulsation) of a pass band and attenuation characteristics caused by the LPF used in the carrier direction. Therefore, the object of the prior art is reducing the above influence. However, the object of the prior art is not removing noise from SP signals based on which channel characteristics are estimated.

Patent Document 1: Japanese Patent Publication No. 3044899

Patent Document 2: Japanese Published Patent Application No. 2002-64413

Patent Document 3: Japanese Published Patent Application No. 2003-101503

DISCLOSURE OF THE INVENTION

Problems the Invention is Going to Solve

The number of data of input/output of a general circuit in the FFT and the IFFT (FFT circuit and IFFT circuit) is a power of two.

In the ISDB-T system and the DVB-T system, the number of sub carriers used in the OFDM system is not a power of two. For example, the number of sub carriers used in a mode 3 in the ISDB-T system is 5617, and the number of sub carriers used in an 8K mode in the DVB-T system is 6817.

In both of the ISDB-T system and the DVB-T system, a SP signal is inserted once every 12 sub carriers. Therefore, if the SP signal is extracted for each symbol, the number of SP signals is 468 in the case of the mode 3 in the ISDB-T system, and 568 in the case of the 8K mode in the DVB-T system, for example. Thus, these numbers are not powers of two.

When a SP signal is interpolated in the symbol direction, one SP signal exists for every 3 sub carriers. Therefore, the number of SP signals after the interpolation is 1873 in the case of the mode 3 in the ISDB-T system, and 2273 in the case of the 8K mode in the DVB-T system, for example. Thus, these numbers are not powers of two.

Because the number of the SP signals and the number of the SP signals after the interpolation in the symbol direction are not powers of two, when the IFFT is performed on a data group, the IFFT is normally performed after inserting zero in an outside of a band to make the number of data to be a power of two.

As in the conventional technology mentioned above, if the processing of removing noise from the data group after the IFFT is performed, and then the FFT is performed on the data group to convert the data group to a frequency domain, a component from which noise has been removed can be obtained in the vicinity of a center of a band. However, at edges of the band, distortion occurs because a high-frequency component of a signal is also removed when noise is removed, and channel characteristics are deteriorated.

In view of this, an object of the present invention is to provide a receiver, an integrated circuit, and a receiving method that can improve estimation accuracy of channel characteristics by removing noise from a SP signal to suppress the distortion of a signal at the edge of the band.

Means of Solving the Problems

The above-mentioned object can be achieved by a receiver for equalizing data signals included in an OFDM signal based on scattered pilot signals that are inserted in a predetermined sub carrier of the OFDM signal, the receiver comprising: a carrier extension unit operable to insert one or more pieces of data into an outside of a lower end of a band in a data group based on a value of a piece of data of the lower end, and insert one or more pieces of data into an outside of an upper end of the band based on a value of a piece of data of the upper end, the data group being composed of pieces of data indicating channel characteristics that are obtained based on the scattered pilot signals and included in a same symbol; an inverse Fourier transform unit operable to perform an inverse fast Fourier transform on a data group composed of $2^N$ pieces of data including the pieces of data inserted by the carrier extension unit, N being a positive integer; a noise removal unit operable to perform noise removal processing on a data group obtained as a result of the inverse fast Fourier transform by the inverse Fourier transform unit, by making smaller a value of a piece of data, in the obtained data group, that is no larger than a value determined by a predetermined procedure; a Fourier transform unit operable to perform a fast Fourier transform on a data group obtained as a result of the noise removal processing by the noise removal unit; and an equalization unit operable to equalize the data signals based on a data group obtained as a result of the fast Fourier transform by the Fourier transform unit.

The integrated circuit of the present invention is an integrated circuit for equalizing data signals included in an OFDM signal based on scattered pilot signals that are inserted in a predetermined sub carrier of the OFDM signal, the integrated circuit comprising: a carrier extension circuit that inserts one or more pieces of data into an outside of a lower end of a band in a data group based on a value of a piece of data of the lower end, and inserts one or more pieces of data into an outside of an upper end of the band based on a value of a piece of data of the upper end, the data group being composed of pieces of data indicating channel characteristics that are obtained based on the scattered pilot signals and included in a same symbol; an inverse Fourier transform circuit that performs an inverse fast Fourier transform on a data group composed of $2^N$ pieces of data including the pieces of data inserted by the carrier extension circuit, N being a positive integer; a noise removal circuit that performs noise removal processing on a data group obtained as a result of the inverse fast Fourier transform by the inverse Fourier transform circuit, by making smaller a value of a piece of data, in the obtained data group, that is no larger than a value determined by a predetermined procedure; a Fourier transform circuit that performs a fast Fourier transform on a data group obtained as a result of the noise removal processing by the noise removal circuit; and an equalization circuit that equalizes the data signals based on a data group obtained as a result of the fast Fourier transform by the Fourier transform circuit.

The receiving method of the present invention is a receiving method for equalizing data signals included in an OFDM signal based on scattered pilot signals that are inserted in a predetermined subcarrier of the OFDM signal, the receiving method comprising: a carrier extension step of inserting one or more pieces of data into an outside of a lower end of a band in a data group based on a value of a piece of data of the lower end, and inserting one or more pieces of data into an outside of an upper end of the band based on a value of apiece of data of the upper end, the data group being composed of pieces of data indicating channel characteristics that are obtained based on the scattered pilot signals and included in a same symbol; an inverse Fourier transform step of performing an inverse fast Fourier transform on a data group composed of $2^N$ pieces of data including the pieces of data inserted by the carrier extension step, N being a positive integer; a noise removal step of performing noise removal processing on a data group obtained as a result of the inverse fast Fourier transform by the inverse Fourier transform step, by making smaller a value of a piece of data, in the obtained data group, that is no larger than a value determined by a predetermined procedure; a Fourier transform step of performing a fast Fourier transform on a data group obtained as a result of the noise removal processing by the noise removal step; and an equalization step of equalizing the data signals based on a data group obtained as a result of the fast Fourier transform by the Fourier transform step.

Effects of the Invention

According to the above-stated receiver, integrated circuit, and receiving method, when data is inserted so that the number of data of the data group that is a target of the IFFT is a power of two, the data whose value is zero is not inserted as in the conventional technology, but the data is inserted into the outside of the lower end of the band based on the value of the data of the lower end of the band of the data group that is the target into which the data is inserted, and the data is inserted into the outside of the upper end of the band based on the value of the data of the upper end of the band. Therefore, compared to the case in which the data whose value is zero is inserted, the broadening of the power spectrum of a SP signal in the data group after the IFFT is small for a frequency, and the ratio of a removed high-frequency component in the data group other than noise is small when noise is removed from the data group after the IFFT. As a result, in the data group obtained by performing the FFT on the data group from which noise has been removed, the distortion at the edge of the band can be suppressed and the estimation accuracy of the channel characteristics can be improved.

In the above-stated receiver, the inverse Fourier transform unit includes: a first inverse Fourier transform unit operable to perform the inverse fast Fourier transform on a data group including $2^{N1}$ pieces of data from a lower end of a band after the data has been inserted by the carrier extension unit, N1 being a positive integer; and a second inverse Fourier transform unit operable to perform the inverse fast Fourier transform on a data group that partly overlaps the data group that is subject to the inverse fast Fourier transform by the first inverse Fourier transform unit, and includes $2^{N2}$ pieces of data from an upper end of the band after the data has been inserted by the carrier extension unit, N2 being a positive integer, the noise removal unit performs the noise removal processing on a data group obtained as a result of the inverse fast Fourier transform by the first inverse Fourier transform unit and a data group obtained as a result of the inverse fast Fourier transform by the second inverse Fourier transform unit, the Fourier transform unit includes: a first Fourier transform unit operable to perform the fast Fourier transform on a data group that is obtained as a result of the inverse fast Fourier transform by the first inverse Fourier transform unit, and is then processed by the noise removal unit; and a second Fourier transform unit operable to perform the fast Fourier transform on a data group that is obtained as a result of the inverse fast Fourier transform by the second inverse Fourier transform unit, and is then processed by the noise removal unit, the receiver further comprises: a synthesis unit operable to synthesize a data group obtained as a result of the fast Fourier transform by the first Fourier transform unit and a data group obtained as a result of the fast Fourier transform by the second Fourier transform unit, and the equalization unit equalizes the data signals based on pieces of data included in a data group obtained as a result of the synthesis by the synthesis unit.

When the number of inserted data is large, there is a possibility that the data group after the IFFT, the noise removal, and the FFT is greatly influenced by the inserted data.

With the above-stated construction, performing the processing by dividing the data group into two so as to be partly overlapped can reduce the number of the data inserted when making the number of the data groups that are targets of the IFFT to be a power of two.

In the above-stated receiver, the synthesis unit selects pieces of data included in the data group obtained as a result of the fast Fourier transform by the first Fourier transform unit in a band having a frequency no higher than a predetermined frequency of a band in which the data group obtained as a result of the fast Fourier transform by the first Fourier transform unit overlaps the data group obtained as a result of the fast Fourier transform by the second Fourier transform unit, and selects pieces of data included in the data group obtained as a result of the fast Fourier transform by the second Fourier transform unit in a band having a frequency higher than the predetermined frequency, to perform switching synthesis on the data group obtained as a result of the fast Fourier transform by the first Fourier transform unit and the data group obtained as a result of the fast Fourier transform by the second Fourier transform unit.

There is a possibility that a high-frequency component in the data group other than noise is also removed at the same time when noise is removed from the signal after the IFFT. An influence that the high-frequency component in the data group other than noise is removed largely appears at an edge of the band of the data group after the FFT.

With the above-stated construction, in the band of the data group after the FFT, the switching synthesis is performed on the data in the band excluding the both edges in which the distortion could be occurring, in the frequency domain, and the data of a data group obtained as a result of the switching synthesis is used for equalization of the data signal and the like. Therefore, the accuracy of the equalization can be improved.

In the above-stated receiver, the carrier extension unit inserts one or more pieces of data each having a same value as the value of the piece of data of the lower end to perform the inserting of the one or more pieces of data into the outside of the lower end of the band, and inserts one or more pieces of data each having a same value as the value of the piece of data of the upper end to perform the inserting of the one or more pieces of data into the outside of the upper end of the band.

With the above-stated construction, the inserting of the data into the vicinity of the lower end or the upper end of the band can be realized by simple apparatus or circuit. Therefore, there is an advantage on the cost front.

In the above-stated receiver, the noise removal unit sets the value that is no larger than the value determined by the predetermined procedure at zero.

With the above-stated construction, the noise removal from the data group after the IFFT can be realized by simple apparatus or circuit. Therefore, there is an advantage on the cost front.

The above-stated receiver further comprises a division unit operable to perform division on the scattered pilot signals by a scattered pilot signal at a time of transmission by a transmission side, wherein the carrier extension unit inserts the one or more pieces of data into a data group composed of a result of the division by the division unit.

An increase in the number of the data of the data group that is a target of the IFFT and the FFT leads to an increase in a processing load and a circuit size.

With the above-stated construction, noise is removed using the data group composed of the data indicating the channel characteristics of the inserted position of the SP signal. Therefore, this construction is effective when the number of the SP signals for one symbol is large, in view of the processing load and the circuit size.

The above-stated receiver further comprises a division unit operable to perform division on the scattered pilot signals by a scattered pilot signal at a time of transmission by a transmission side; and a symbol interpolation unit operable to perform interpolation processing based on a result of the division by the division unit in a symbol direction, to calculate the pieces of data indicating the channel characteristics of each of signal positions in the sub carrier in which the scattered pilot signals are inserted, wherein the carrier extension unit inserts the one or more pieces of data into a data group composed of a result of the interpolation processing by the symbol interpolation unit.

The above-stated receiver further comprises a division unit operable to perform division on the scattered pilot signals by a scattered pilot signal at a time of transmission by a transmission side; and an interpolation unit operable to perform interpolation processing based on a result of the division by the division unit in a symbol direction and a carrier direction, to calculate pieces of data indicating channel characteristics for all of sub carriers, wherein the carrier extension unit inserts the one or more pieces of data into a data group composed of a result of the calculation by the interpolation unit.

If the number of the data groups after the IFFT is small, there is a possibility that the noise component cannot be fully removed.

With the above-stated construction, after increasing the number of the data by performing the interpolation processing in the symbol direction, or further increasing the number of the data by performing the interpolation processing in the symbol direction and the interpolation processing in the carrier direction, the processing of removing noise is performed. Therefore, even if the required number of the SP signals for removing noise are not included in one symbol, the case in which noise cannot be removed because of the lack of the number of the SP signals included in one symbol can be prevented.

The receiver of the present invention is a receiver for equalizing data signals included in an OFDM signal based on scattered pilot signals that are inserted in a predetermined sub-carrier of the OFDM signal, the receiver comprising: a division unit operable to perform division on the scattered pilot signals by a scattered pilot signal at a time of transmission by a transmission side; an inverse Fourier transform unit operable to perform an inverse fast Fourier transform on a data group composed of $2^N$ pieces of data in a same symbol that are a part of a result of the division by the division unit, N being a positive integer; a noise removal unit operable to perform noise removal processing on a data group obtained as a result of the inverse fast Fourier transform by the inverse Fourier transform unit, by making smaller a value of a piece of data, in the obtained data group, that is no larger than a value determined by a predetermined procedure; a Fourier transform unit operable to perform a fast Fourier transform on a data group obtained as a result of the noise removal processing by the noise removal unit; an interpolation unit operable to perform interpolation processing on a data group composed of pieces of data excluding the $2^N$ pieces of data, and pieces of data-transformed by the Fourier transform unit in a symbol direction and a carrier direction, to calculate pieces of data indicating channel characteristics for all of sub carriers; and an equalization unit operable to equalize the data signals based on a data group obtained as a result of the interpolation processing by the interpolation unit.

With the above-stated receiver, the inserting of the data so that the number of data of the data group that is a target of the IFFT is a power of two is not performed. Therefore, it can suppress the distortion in the vicinity of the lower end and the upper end of the band, which is caused by the inserting of the data whose value is zero.

Figure 1:
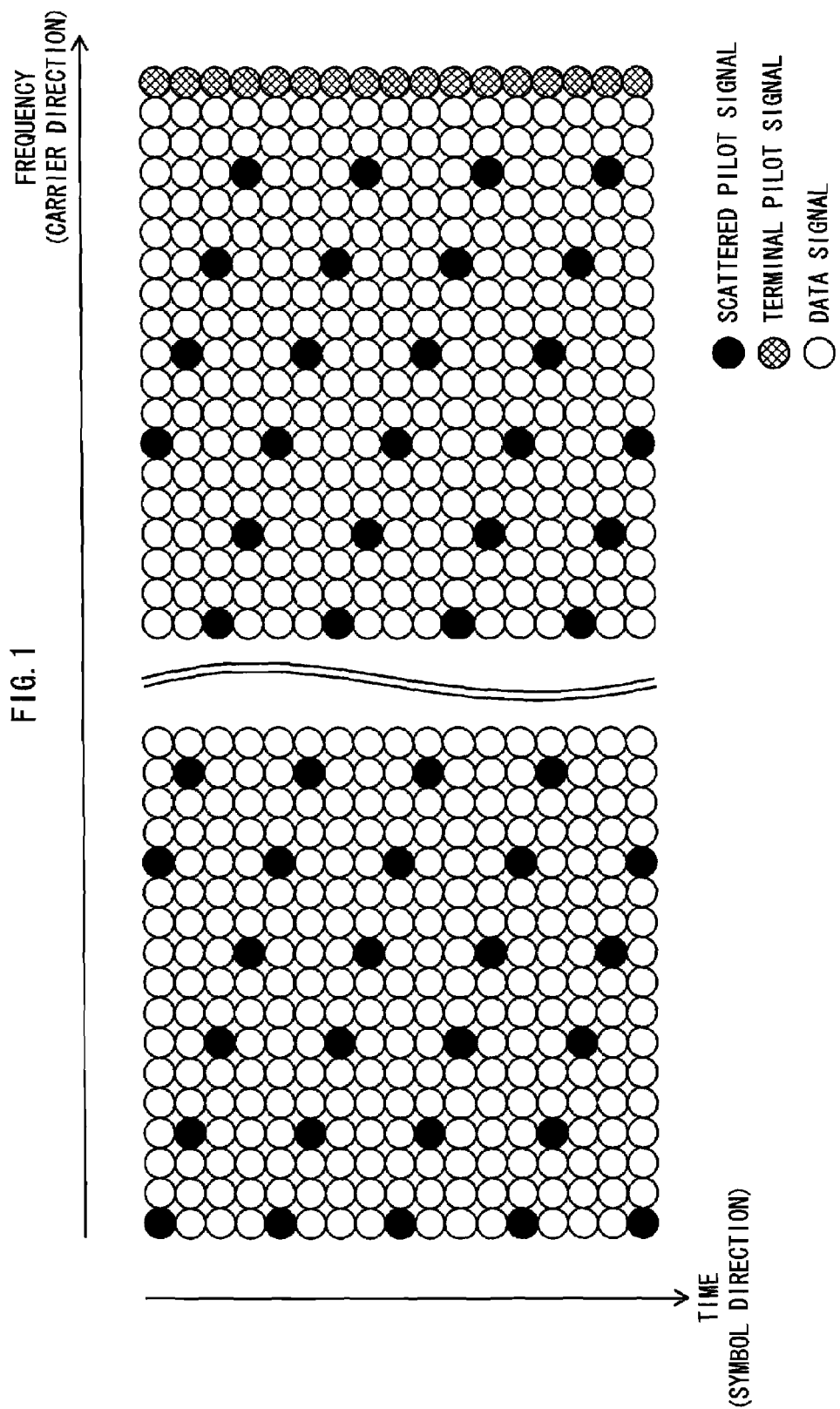
FIG. 1 shows an arrangement of SP signals in a DVB-T system and an ISDB-T system.

DESCRIPTION OF REFERENCE NUMERALS 100 antenna
101 tuner
102 A/D converter
103 quadrature detection circuit
104 FFT circuit
105 equalization circuit
106 frequency de-interleaver circuit
107 bit de-interleaver circuit
108 error correction circuit 200 delay circuit
201 SP extraction circuit
202 SP generator circuit
203 complex division circuit
204 noise removal circuit
205 memory
206 symbol interpolation circuit
207 carrier interpolation circuit
208 complex division circuit
301 SP signal separation circuit
302 delay circuit
303 IFFT circuit
304 noise removal filter
305 FFT circuit
306 SP signal synthesis circuit

BEST MODE FOR CARRYING OUT THE INVENTION

First Embodiment

The following describes a first embodiment of the present invention, with reference to the attached drawings.

<Receiver>

Figure 2:
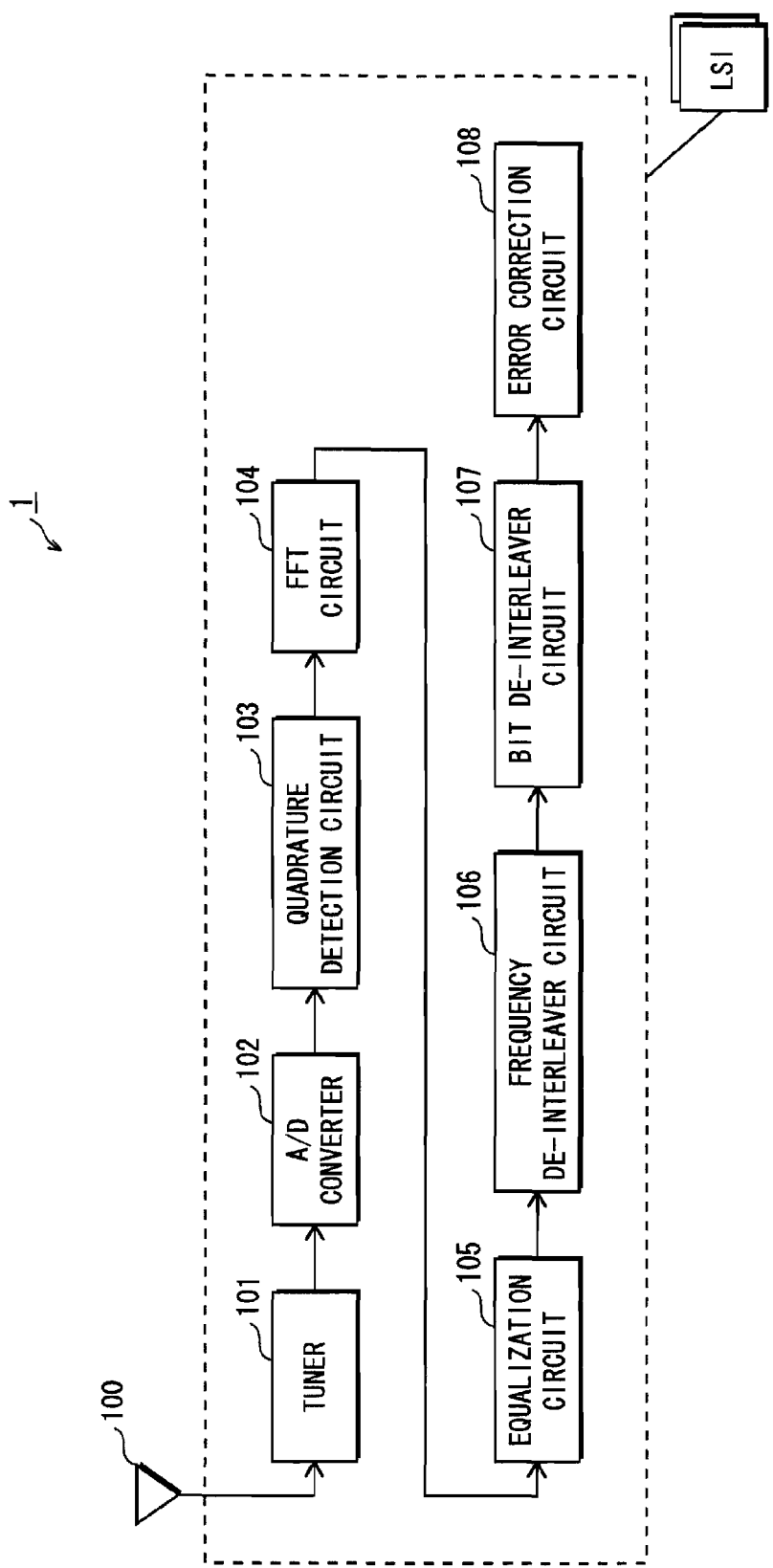
FIG. 2 is a block diagram showing a whole structure of a receiver of a first embodiment.

The following describes a structure of a receiver of the first embodiment, with reference to FIG. 2. FIG. 2 is a block diagram showing a whole structure of the receiver in the DVB-T system. Note that the structure of the receiver in the DVB-H system is same as in the DVB-T system.

A receiver 1 includes an antenna 100, a tuner 101, an A/D converter 102, a quadrature detection circuit 103, a FFT circuit 104, an equalization circuit 105, a frequency de-interleaver circuit 106, a bit de-interleaver circuit 107, and an error correction circuit 108. Note that a synchronizing circuit is omitted in FIG. 2 because it does not relate to an essence of the present invention.

The antenna 100 receives an OFDM signal and outputs the OFDM signal to the tuner 101. The tuner 101 tunes the OFDM signal inputted from the antenna 100, down-converts the tuned OFDM signal to a predetermined frequency, and outputs the down-converted OFDM signal to the A/D converter 102. The A/D converter 102 converts an inputted analog signal to a digital signal and outputs the converted digital signal to the quadrature detection circuit 103. The quadrature detection circuit 103 performs quadrature detection on the converted digital signal inputted from the A/D converter 102, and outputs the signal after the quadrature detection to the FFT circuit 104.

The FFT circuit 104 performs the FFT on the signal after the quadrature detection to convert the signal after the quadrature detection to a signal in a frequency domain, and outputs the converted signal to the equalization circuit 105. The equalization circuit 105 performs equalization processing on the signal after the FFT performed by the FFT circuit 104, and outputs the processed signal to the frequency de-interleaver circuit 106. The frequency de-interleaver circuit 106 performs frequency de-interleave processing on the signal on which the equalization processing is performed by the equalization circuit 105. The bit de-interleaver circuit 107 performs bit de-interleave processing on the signal after the frequency de-interleave processing. The error correction circuit 108 performs error correction processing on the signal after the bit de-interleave processing.

Although a detail of the equalization circuit 105 will be described later, a detail of the processing of each of the other circuits is omitted because it is same as the processing that is normally performed.

Note that a time de-interleaver circuit for performing time de-interleave processing is added in the case of the ISDB-T system.

<Equalization Circuit>

(Circuit Structure)

Figure 3:
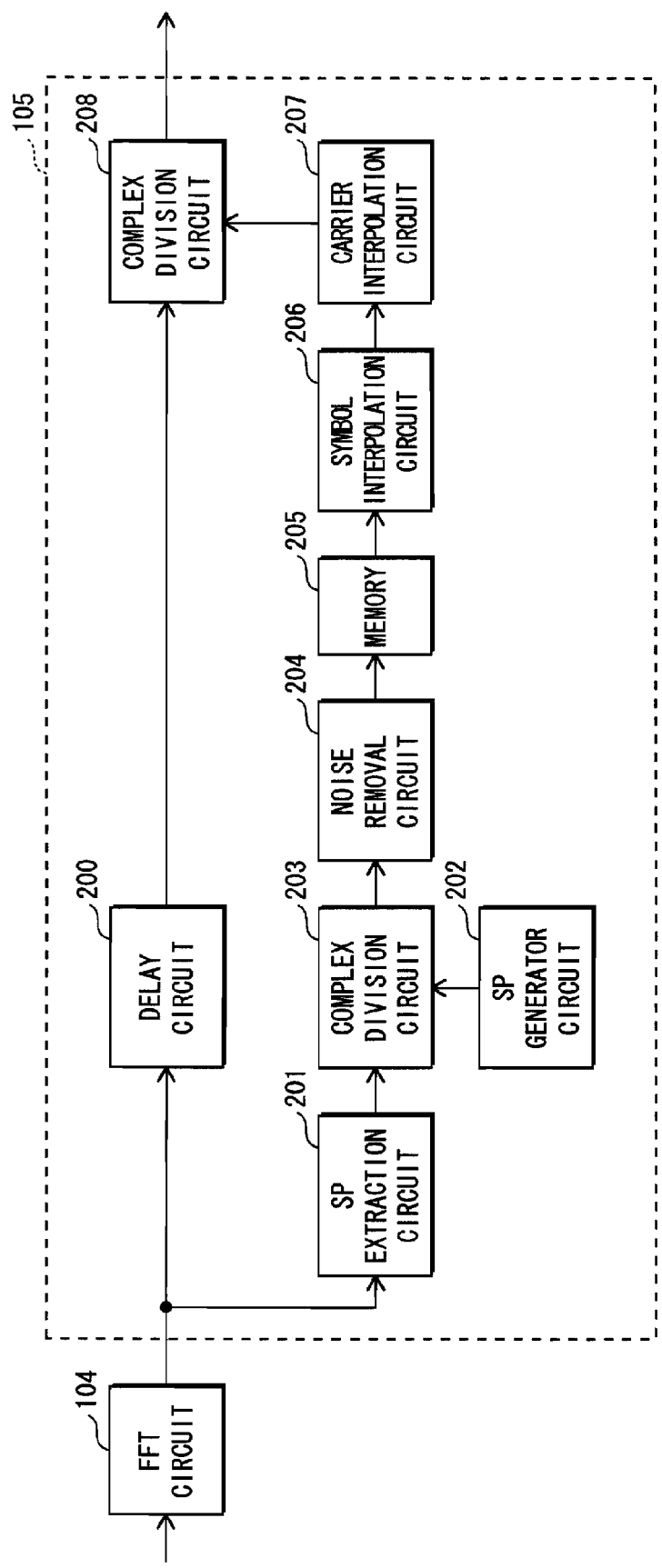
FIG. 3 is a block diagram showing a structure of an equalization circuit in FIG. 2.

The following describes a structure of the equalization circuit in FIG. 2, with reference to FIG. 3. FIG. 3 is a block diagram showing the structure of the equalization circuit, and has a structure of removing noise that is superimposed on a SP signal.

The equalization circuit 105 includes a delay circuit 200, a SP extraction circuit 201, a SP generator circuit 202, a complex division circuit 203, a noise removal circuit 204, a memory 205, a symbol interpolation circuit 206, a carrier interpolation circuit 207, and a complex division circuit 208.

The delay circuit 200 delays an input from the FFT circuit 104 and outputs the delayed input to the complex division circuit 208 so that data indicating channel characteristics used for complex division of a data signal and the like in the complex division circuit 208 in a latter part is data indicating channel characteristics of a signal position of the data signal and the like.

The SP extraction circuit 201 extracts SP signals from a signal after the FFT performed by the FFT circuit 104, and outputs the extracted SP signal to the complex division circuit 203.

The SP generator circuit 202 generates a signal having same amplitude and phase as a SP signal at the time of transmission by a transmitter in a logic circuit and the like, and outputs the generated signal to the complex division circuit 203.

The complex division circuit 203 performs complex division on the SP signal inputted from the SP extraction circuit 201 by the signal inputted from the SP generator circuit 202 in a sub carrier position of the SP signal, and adjusts the phase of the SP signal that is BPSK modulated by the transmitter. By this processing, data indicating channel characteristics in each of SP signal positions is obtained.

The noise removal circuit 204 performs noise removal processing that will be described later on a data group composed of pieces of data each indicating channel characteristics of the SP signal position in a same symbol inputted from the complex division circuit 203, with reference to FIGS. 5 to 7 to remove noise from each of the pieces of data indicating the channel characteristics of the SP signal position. Then, the noise removal circuit 204 outputs the data indicating the channel characteristics of the SP signal position after the noise removal to the memory 205.

The memory 205 stores the data indicating the channel characteristics after the noise removal in the SP signal position.

The symbol interpolation circuit 206 performs interpolation processing on a data group composed of pieces of data indicating channel characteristics of SP signal positions in a same sub carrier in a time axis direction (symbol direction) using the LPF (interpolation in the symbol direction), when the predetermined number of data indicating channel characteristics are stored in the memory 205 to estimate data indicating channel characteristics of each of signal positions in a sub carrier in which a SP signal is inserted. The symbol interpolation circuit 206 outputs a result of the estimation to the carrier interpolation circuit 207.

The carrier interpolation circuit 207 performs interpolation processing on a data group composed of the result of the estimation in a same symbol inputted from the symbol interpolation circuit 206 in a frequency axis direction (carrier direction) using the LPF (interpolation in the carrier direction), to estimate data indicating channel characteristics for all of sub carriers. The carrier interpolation circuit 207 outputs a result of the estimation to the complex division circuit 208.

The complex division circuit 208 performs complex division on the data signal and the like after the FFT performed by the FFT circuit 104 inputted from the delay circuit 200, by the data indicating the channel characteristics of a signal position of the data signal and the like inputted from the carrier interpolation circuit 207, and outputs a result of the complex division to the frequency de-interleaver circuit 106 in a latter part as a signal obtained by equalizing the data signal and the like.

(Circuit Operation)

The following describes a circuit operation of the equalization circuit 105 whose circuit structure has been described, with reference to FIG. 3.

A signal after the FFT performed by the FFT circuit 104 is inputted to the delay circuit 200 and the SP extraction circuit 201.

The SP extraction circuit 201 extracts a SP signal from the signal after the FFT, and the SP signal extracted by the SP extraction circuit 201 is inputted to the complex division circuit 203. At this time, the SP generator circuit 202 outputs a same signal as a SP signal at the time of transmission by a transmitter to the complex division circuit 203. The complex division circuit 203 performs complex division on the SP signal inputted from the SP extraction circuit 201 by the signal inputted from the SP generator circuit 202 to calculate data indicating channel characteristics of the SP signal position. Then, a result of the calculation is inputted to the noise removal circuit 204.

The noise removal circuit 204 removes noise from the data indicating the SP signal position inputted from the complex division circuit 203. Then, the data indicating the channel characteristics of the SP signal position after the noise removal is stored in the memory 205.

When the predetermined number of data indicating channel characteristics are stored in the memory 205, the symbol interpolation circuit 206 performs interpolation processing on a data group composed of pieces of data indicating channel characteristics of SP signal positions in the symbol direction. Then, the carrier interpolation circuit 207 performs interpolation processing on the data group inputted from the symbol interpolation circuit 206 in the carrier direction to calculate data indicating channel characteristics for all of sub carriers, and outputs a result of the calculation to the complex division circuit 208.

Data signal and the like outputted from the FFT circuit 104 are delayed by the delay circuit 200, and inputted to the complex division circuit 208.

The complex division circuit 208 performs complex division on the data signal and the like by the data indicating the channel characteristics of a signal position of the data signal and the like inputted from the carrier interpolation circuit 207, and outputs a result of the complex division to the frequency de-interleaver circuit 106 in a latter part.

<Noise Removal Circuit>

(Circuit Structure)

Figure 4:
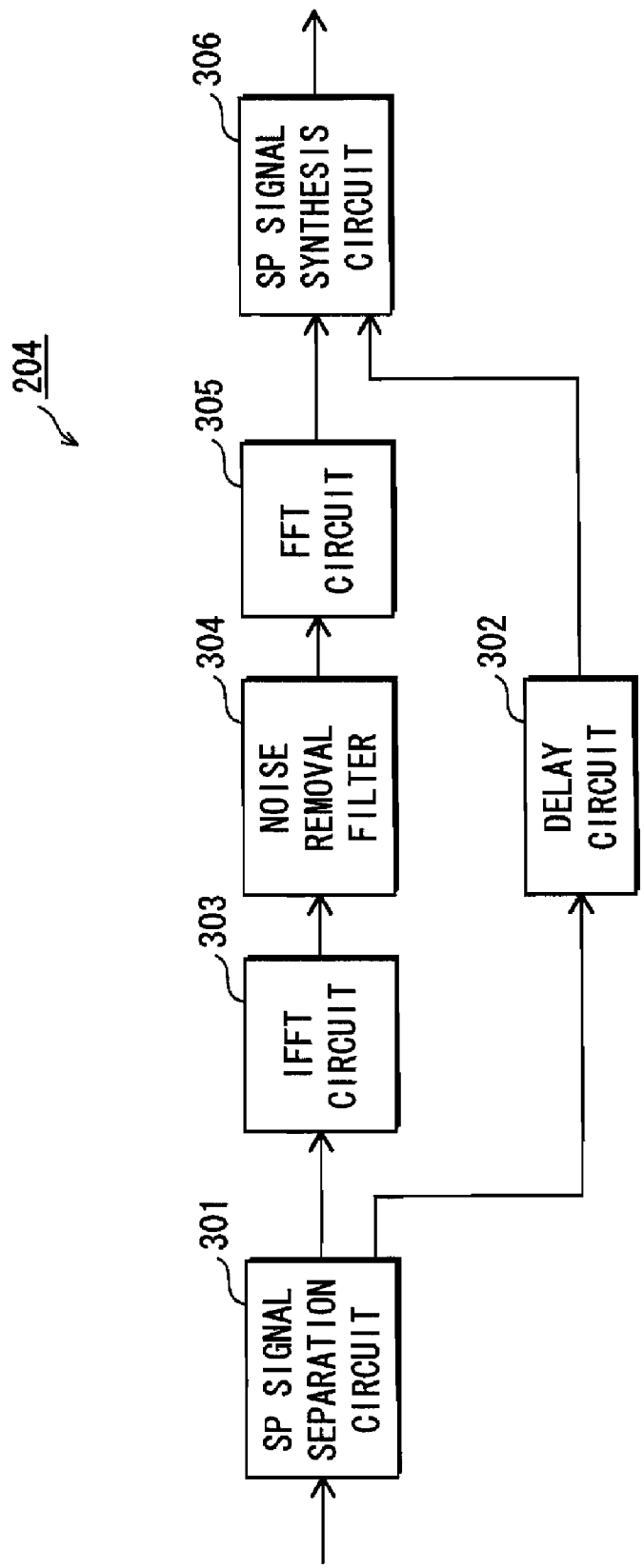
FIG. 4 is a block diagram showing a structure of a noise removal circuit in FIG. 3.

The following describes a structure of the noise removal circuit in FIG. 3, with reference to FIG. 4. FIG. 4 is a block diagram showing the structure of the noise removal circuit.

The noise removal circuit 204 includes a SP signal-separation circuit 301, a delay circuit 302, an IFFT circuit 303, a noise removal filter 304, a FFT circuit 305, and a SP signal synthesis circuit 306.

The SP signal separation circuit 301 separates a data group composed of pieces of data each indicating channel characteristics of a SP signal position inputted from the complex division circuit 203 into $2^N$ (N is a positive integer) pieces of data in a central part of a band and data other than the $2^N$ pieces of data, for each symbol. Then, the SP signal separation circuit 301 outputs the $2^N$ pieces of data in the central part of the band to the IFFT circuit 303, and outputs the data other than the $2^N$ pieces of data to the delay circuit 302. Here, when the number of SP signals extracted by the SP extraction circuit 201 for each symbol is M, there is a relation that $2^N$ is equal to or smaller than M, and $2^{(N+1)}$ is larger than M.

For example, in the case of the 8K mode in the DVB-T system/DVB-H system, the number of SP signals included in one symbol is 568. The SP signal separation circuit 301 outputs 512 pieces of data in the central part of the band to the IFFT circuit 303, and outputs 28 pieces of data in a lower part of the band and 28 pieces of data in an upper part of the band to the delay circuit 302.

The delay circuit 302 delays an input from the SP signal separation circuit 301 and outputs the delayed input to the SP signal synthesis circuit 306, so that data indicating channel characteristics inputted from the FFT circuit 305 to the SP signal synthesis circuit 306 in a latter part and data indicating channel characteristics inputted from the delay circuit 302 to the SP signal synthesis circuit 306 are in a same symbol position.

The IFFT circuit 303 performs the IFFT on the data group composed of the $2^N$ pieces of data inputted from the SP signal separation circuit 301, and outputs the data group after the IFFT to the noise removal filter 304.

The noise removal filter 304 performs processing of removing noise in which a value of a sample point is set to zero for each sample point of the data group after the IFFT, if a power value of the sample point is equal to or smaller than a value determined by a predetermined procedure, and outputs the data group after the noise removal to the FFT circuit 305.

The FFT circuit 305 performs the FFT on the data group after the noise removal inputted from the noise removal filter 304 to return the data group to a signal in a frequency domain, and outputs the data group after the FFT to the SP signal synthesis circuit 306.

The SP signal synthesis circuit 306 synthesizes the pieces of data indicating channel characteristics of SP signal positions in the lower part and the upper part of the band inputted from the delay circuit 302 and the data after the noise removal in the central part of the band inputted from the FFT circuit 305 in the frequency domain, so that each of the pieces of data is arranged in an original frequency position. Then, the SP signal synthesis circuit 306 outputs the data group after the synthesis to the memory 205 in a latter part.

(Circuit Operation)

The following describes a circuit operation of the noise removal circuit whose circuit structure has been described, with reference to FIG. 4.

Data indicating channel characteristics of a SP signal position outputted from the complex division circuit 203 is inputted to the SP signal separation circuit 301. Then, the SP signal separation circuit 301 outputs $2^N$ pieces of data in a central part of a band to the IFFT circuit 303, and outputs data other than the central part of the band to the delay circuit 302.

On a data group composed of the $2^N$ pieces of data in the central part of the band outputted from the SP signal separation circuit 301, IFFT processing by the IFFT circuit 303, noise removal processing by the noise removal filter 304, and FFT processing by the FFT circuit 305 are performed, and the data group on which these processing have been performed is inputted to the SP signal synthesis circuit 306.

The data other than the central part of the band outputted from the SP signal separation circuit 301 are delayed by the delay circuit 302, and inputted to the SP signal synthesis circuit 306.

The SP signal synthesis circuit 306 synthesizes the data inputted from the FFT circuit 305 and the data inputted from the delay circuit 302 in the frequency domain, and stores the data group after the synthesis in the memory 205.

<Noise Removal Filter>

Figure 5:
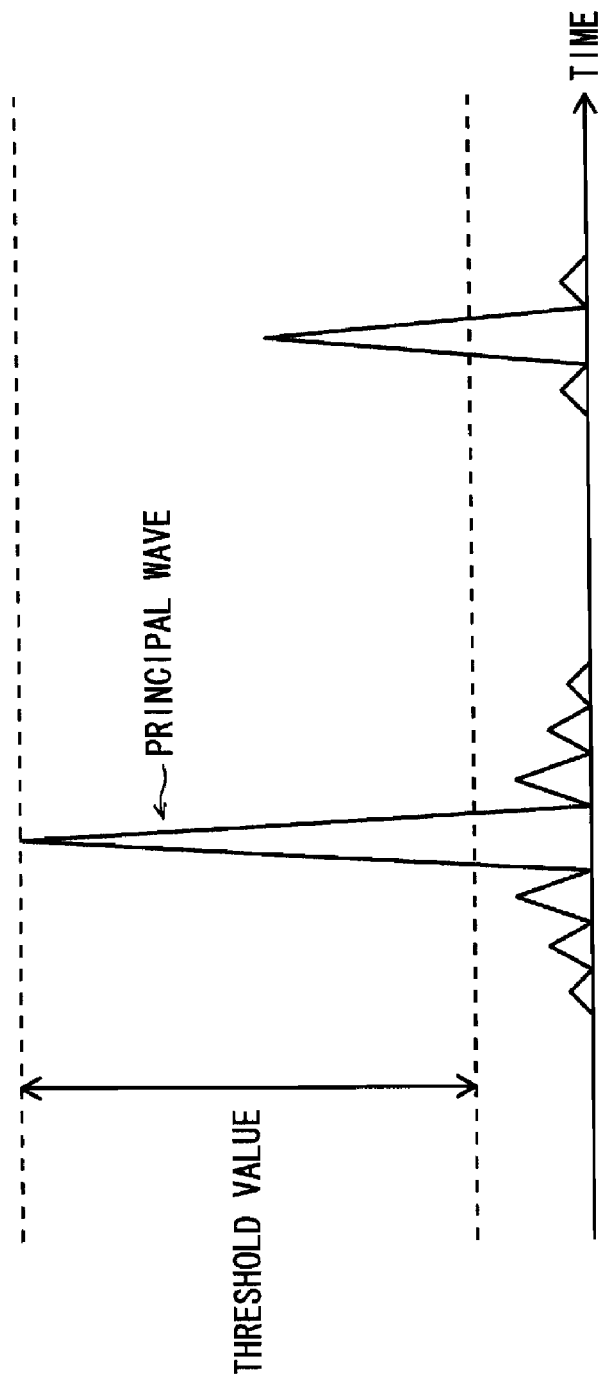
FIG. 5 describes processing of a noise removal filter in FIG. 4.

The following describes processing of the noise removal filter 304, with reference to FIG. 5. FIG. 5 describes the processing of the noise removal filter, and shows a part of a signal after the IFFT performed by the IFFT circuit 303.

The noise removal filter 304 sets a value of a sample point to zero if a power value of the sample point is equal to or smaller than a value obtained by subtracting a predetermined threshold value from a power value of a principal wave, based on the power of the principal wave.

In order to improve reception performance, it is required to reduce necessary C/N (Carrier to Noise) by noise removal processing and the like in the reception limit, and a threshold value of removing noise is varied in accordance with QPSK (Quadrature Phase Shift Keying), 16 QAM (Quadrature Amplitude Modulation), and 64 QAM. An example of each of threshold values when a code rate (convolution coding rate) is ½ is shown in FIG. 6. Each of the threshold values shown in FIG. 6 can be used in each of noise removal processing that will be described later.

In the case of 64 QAM, since the minimum Euclidean distance of a mapping point is small, if a threshold value of noise removal processing is small, noise can be removed but channel characteristics are deteriorated because distortion becomes large. In the case of QPSK, since the minimum Euclidean distance of a mapping point is large, even if the threshold value of the noise removal processing is set to be large and the distortion becomes large, an effect obtained by removing noise is larger than the deterioration of the channel characteristics.

Note that it is desirable to set a threshold value in view of the number of inserted data, when data is inserted into an outside of a lower end of a band and an outside of an upper end of the band in embodiments that will be described later.

Figures 6, 7:
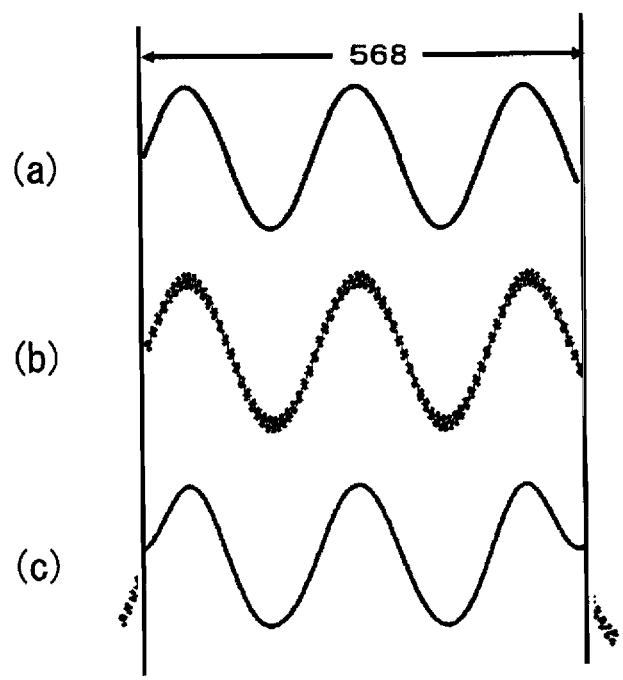
FIG. 6 shows a threshold value of noise removal processing by the noise removal filter in FIG. 4.
FIG. 7 shows a result of a noise removal by the noise removal circuit in FIG. 3.

FIG. 7 shows an example in which noise has been removed. FIG. 7 shows a case in which the SP signal separation circuit 301 outputs 512 pieces of data in a central part of a band to the IFFT circuit 303, and outputs 28 pieces of data in a lower part of the band and 28 pieces of data in an upper part of the band to the delay circuit 302, in the case of the 8K mode in the DVB-T system. FIG. 7 (a) shows channel characteristics when there is no noise, FIG. 7 (b) shows channel characteristics when noise is superimposed, and FIG. 7 (c) shows channel characteristics when noise removal processing is performed.

Second Embodiment

The following describes a second embodiment of the present invention, with reference to the attached drawings.

In the noise removal circuit in FIG. 4, noise is removed from a part of data indicating channel characteristics of a SP signal position, but noise is not removed from other data. Therefore, a noise removal circuit of the second embodiment performs noise removal processing on each of data groups that are separated by a SP signal separation circuit to remove noise from all of data indicating channel characteristics of SP signal positions.

<Noise Removal Circuit>

(Circuit Structure)

Figure 8:
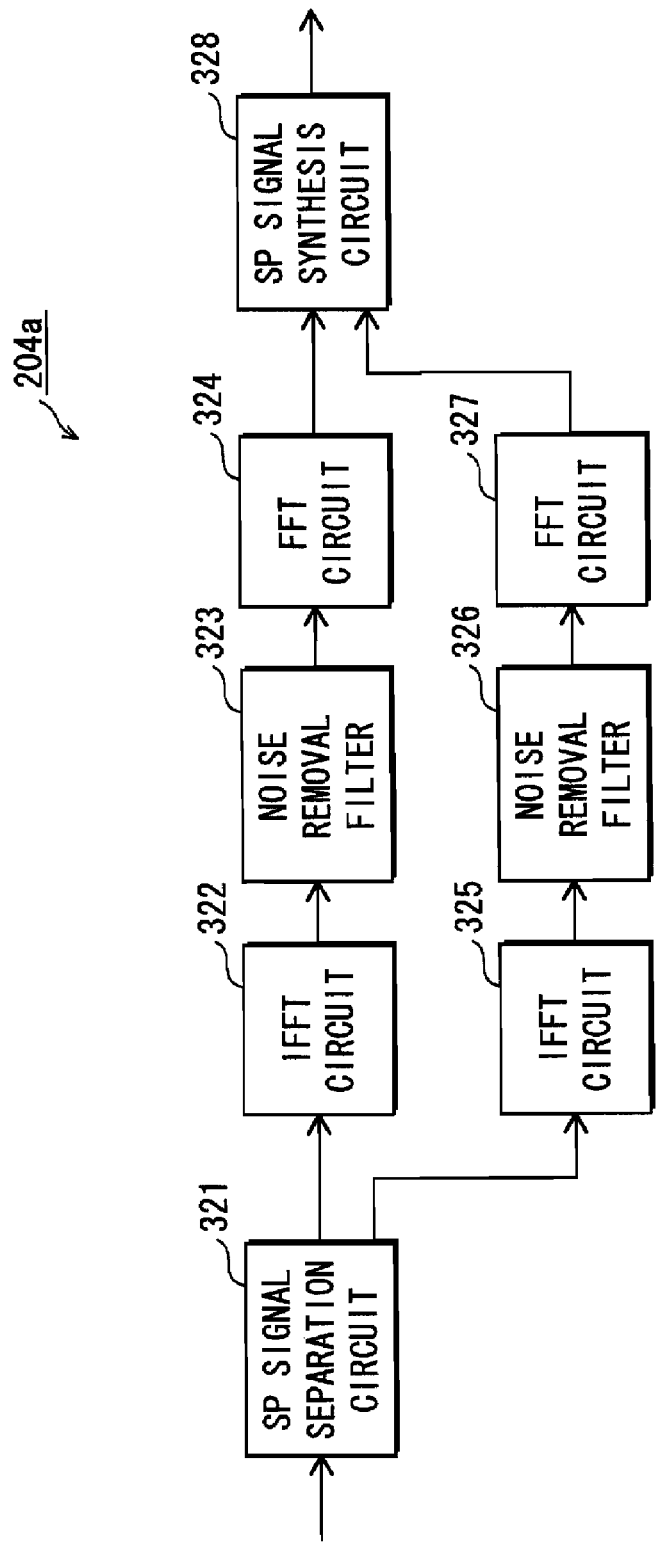
FIG. 8 is a block diagram showing a structure of a noise removal circuit of a second embodiment.

The following describes a structure of the noise removal circuit of the second embodiment, with reference to FIG. 8. FIG. 8 is a block diagram showing the structure of the noise removal circuit.

A noise removal circuit 204a includes a SP signal separation circuit 321, an IFFT circuit 322, a noise removal filter 323, a FFT circuit 324, an IFFT circuit 325, a noise removal filter 326, a FFT circuit 327, and a SP signal synthesis circuit 328.

Out of a data group composed of pieces of data each indicating channel characteristics of a SP signal position inputted from the complex division circuit 203, the SP signal separation circuit 321 outputs $2^N$ (N is a positive integer) pieces of data from a lower end of a band to the IFFT circuit 322, and outputs $2^N$ pieces of data from an upper end of the band to the IFFT circuit 325 for each symbol. Here, when the number of SP signals extracted by the SP extraction circuit 201 for each symbol is M, there is a relation that $2^N$ is smaller than M, and $2^N$ is larger than M/2.

The IFFT circuit 322 performs the IFFT on the data group composed of the $2^N$ pieces of data inputted from the SP signal separation circuit 321, and outputs the data group after the IFFT to the noise removal filter 323.

The noise removal filter 323 performs the same processing as the noise removal filter 304 on the data group inputted from the IFFT circuit 322, and outputs the data group after the noise removal to the FFT circuit 324.

The FFT circuit 324 performs the FFT on the data group after the noise removal inputted from the noise removal filter 323 to return the data group to a signal in a frequency domain, and outputs the data group after the FFT to the SP signal synthesis circuit 328.

The IFFT circuit 325 performs the IFFT on the data group composed of the $2^N$ pieces of data inputted from the SP signal separation circuit 321, and outputs the data group after the IFFT to the noise removal filter 326.

The noise removal filter 326 performs the same processing as the noise removal filter 304 on the data group inputted from the IFFT circuit 325, and outputs the data group after the noise removal to the FFT circuit 327.

The FFT circuit 327 performs the FFT on the data group after the noise removal inputted from the noise removal filter 326 to return the data group to a signal in the frequency domain, and outputs the data group after the FFT to the SP signal synthesis circuit 328.

The SP signal synthesis circuit 328 selects the data included in the data group after the noise removal inputted from the FFT circuit 324 from the lower end of the band to the central part of the band, for example, and selects the data included in the data group after the noise removal inputted from the FFT circuit 327 from the upper end of the band to the central part of the band, to perform switching synthesis in the frequency domain. The SP signal synthesis circuit 328 outputs the data group after the synthesis to the memory 205 in a latter part.

(Circuit Operation)

The following describes a circuit operation of the noise removal circuit whose circuit structure has been described, with reference to FIG. 8.

Data indicating channel characteristics of a SP signal position outputted from the complex division circuit 203 is inputted to the SP signal separation circuit 321. Then, the SP signal separation circuit 321 outputs $2^N$ pieces of data from a lower end of a band to the IFFT circuit 322, and outputs $2^N$ pieces of data from an upper end of the band to the IFFT circuit 325.

On a data group composed of the $2^N$ pieces of data from the lower end of the band outputted from the SP signal separation circuit 321, IFFT processing by the IFFT circuit 322, noise removal processing by the noise removal filter 323, and FFT processing by the FFT circuit 324 are performed, and the data group on which these processing have been performed is inputted to the SP signal synthesis circuit 328.

On a data group composed of the $2^N$ pieces of data from the upper end of the band outputted from the SP signal separation circuit 321, IFFT processing by the IFFT circuit 325, noise removal processing by the noise removal filter 326, and FFT processing by the FFT circuit 327 are performed, and the data group is inputted to the SP signal synthesis circuit 328.

The SP signal synthesis circuit 328 performs switching synthesis on the data inputted from the FFT circuit 324 and the data inputted from the FFT circuit 327 in the frequency domain, and stores the data group after the synthesis in the memory 205.

(Concrete Example of Noise Removal Circuit)

Figure 9:
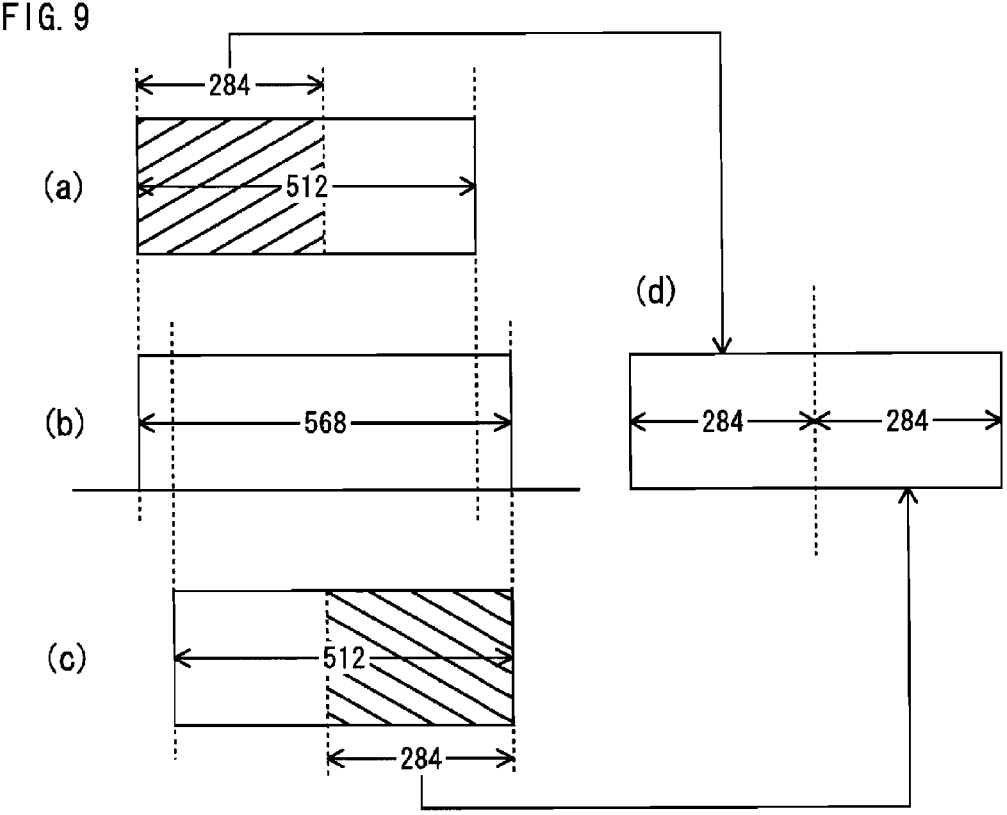
FIG. 9 describes a concrete example of the noise removal circuit in FIG. 8.

The following describes a concrete example of processing performed by the noise removal circuit 204a in FIG. 8, with reference to FIG. 9. FIG. 9 describes the concrete example of the processing performed by the noise removal circuit 204a in the case of the 8K mode in the DVB-T system.

FIG. 9 (b) shows 568 pieces of data indicating channel characteristics of SP signal positions.

The SP signal separation circuit 321 outputs 512 ($=2^9$) pieces of data from a lower end of a band to the IFFT circuit 322 as shown in FIG. 9 (a), and outputs 512 pieces of data from an upper end of the band to the IFFT circuit 325 as shown in FIG. 9 (c).

On a data group composed of 512 pieces of data from the lower end of the band, IFFT processing by the IFFT circuit 322, noise removal processing by the noise removal filter 323, and FFT processing by the FFT circuit 324 are performed, and the data group on which these processing have been performed is inputted to the SP signal synthesis circuit 328.

On a data group composed of 512 pieces of data from the upper end of the band, IFFT processing by the IFFT circuit 325, noise removal processing by the noise removal filter 326, and FFT processing by the FFT circuit 327 are performed, and the data group on which these processing have been performed is inputted to the SP signal synthesis circuit 328.

The SP signal synthesis circuit 328 selects the data inputted from the FFT circuit 324 as 284 pieces of data from the lower end of the band to the central part of the band as shown in FIGS. 9 (a) and 9 (d), and selects the data inputted from the FFT circuit 327 as 284 pieces of data from the upper end of the band to the central part of the band as shown in FIGS. 9 (c) and 9 (d). Then, the SP signal synthesis circuit 328 performs switching synthesis on the selected data in the frequency domain, and outputs the data group after the synthesis to the memory 205 in a latter part.

Figure 10:
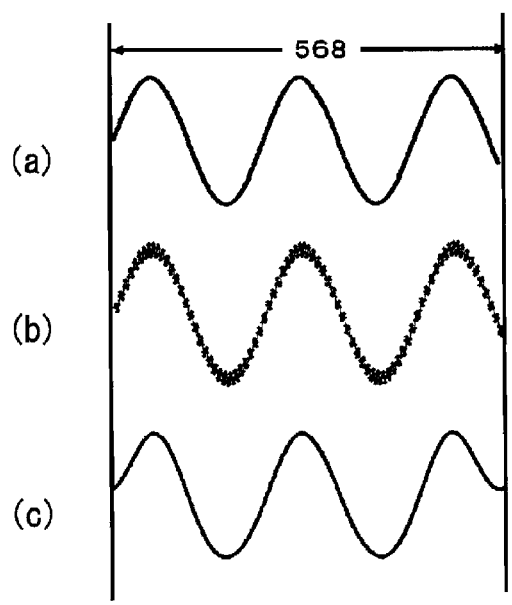
FIG. 10 shows a result of a noise removal by the noise removal circuit in FIG. 8.

FIG. 10 shows an example in which noise has been removed in the case of the above concrete example. FIG. 10 (a) shows channel characteristics when there is no noise, FIG. 10 (b) shows channel characteristics when noise is superimposed, and FIG. 10 (c) shows channel characteristics when noise removal processing is performed. It can be found that little distortion occurs in the central part of the band although some distortion occurs in the end part of the band.

Third Embodiment

The following describes a third embodiment of the present invention, with reference to the attached drawings.

In the noise removal circuit in FIG. 4, noise is removed from a part of data indicating channel characteristics of a SP signal position, but noise is not removed from other data. Therefore, a noise removal circuit of the third embodiment inserts data into an outside of a lower end of a band and an outside of an upper end of the band to make the number of data to be a power of two, and removes noise from all of data indicating channel characteristics of SP signal positions.

<Noise Removal Circuit>

(Circuit Structure)

Figure 11:
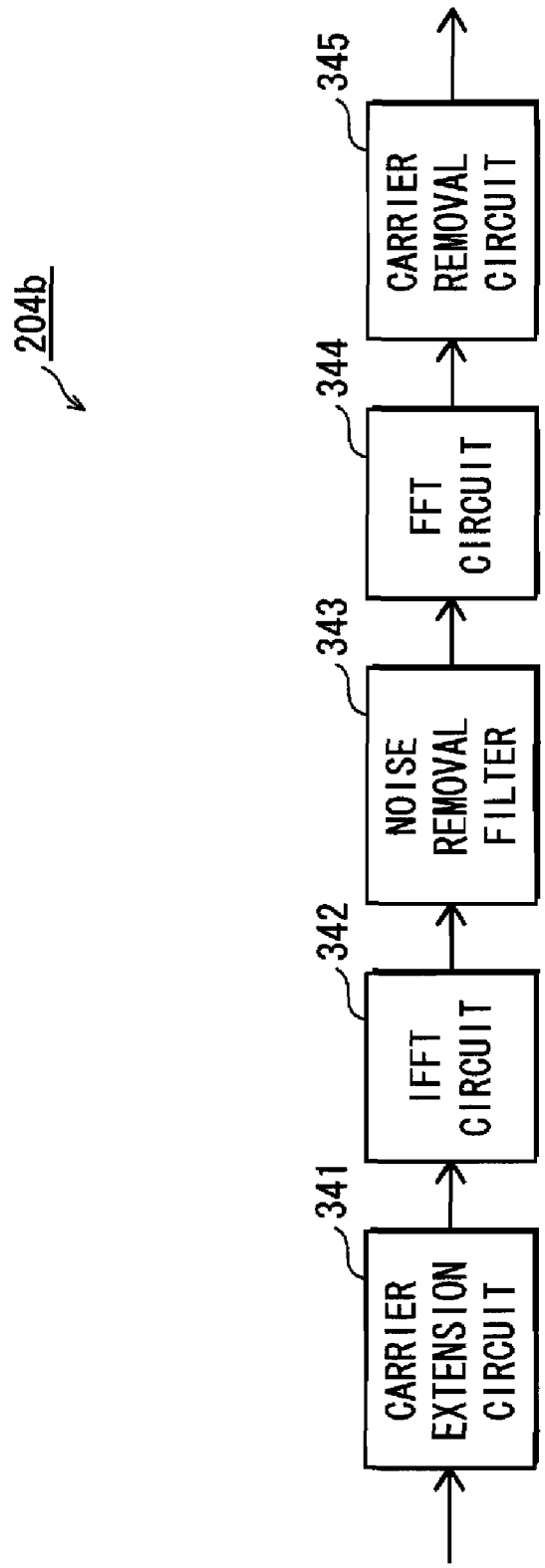
FIG. 11 is a block diagram showing a structure of a noise removal circuit of a third embodiment.

The following describes a structure of the noise removal circuit of the third embodiment, with reference to FIG. 11. FIG. 11 is a block diagram showing the structure of the noise removal circuit.

A noise removal circuit 204b includes a carrier extension circuit 341, an IFFT circuit 342, a noise removal filter 343, a FFT circuit 344, and a carrier removal circuit 345.

Figure 12:
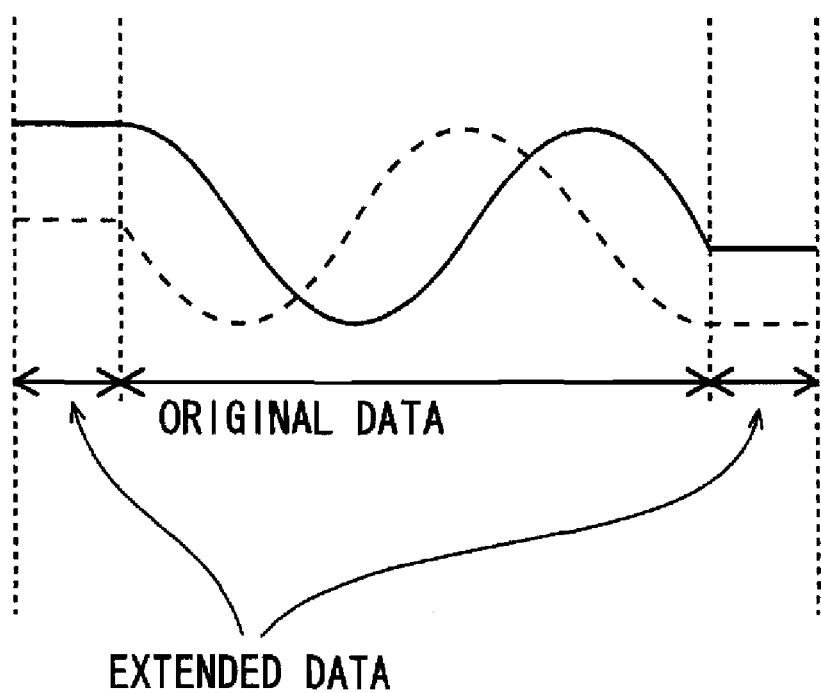
FIG. 12 describes processing of a carrier extension circuit and a carrier removal circuit in FIG. 11.

As shown in FIG. 12, the carrier extension circuit 341 extends the number of data to $2^K$ (K is a positive integer) in the following way. For a data group that is composed of pieces of data indicating channel characteristics inputted from the complex division circuit 203, and included in a same symbol, the carrier extension circuit 341 makes a copy of a value of data of a lower end to an outside of the lower end of a band to insert L pieces of data having the same value as the data of the lower end, and makes a copy of a value of data of the upper end to an outside of the upper end of the band to insert L pieces of data having the same value as the data of the upper end. Then, the carrier extension circuit 341 outputs the data group composed of $2^K$ pieces of data after the extension to the IFFT circuit 342.

Here, when the number of SP signals extracted by the SP extraction circuit 201 for one symbol is M, there is a relation that $2^{K-1}$ is equal to or smaller than M, and $2^K$ is larger than M.

For example, in the case of the mode 3 in the ISDB-T system, the number of SP signals included in one symbol is 468. Therefore, 22 pieces of data is inserted into each of the outside of the lower end of the band and the outside of the upper end of the band to extend the number of data to 512.

The IFFT circuit 342 performs the IFFT on the data group composed of the $2^K$ pieces of data inputted from the carrier extension circuit 341, and outputs the data group after the IFFT to the noise removal filter 343.

The noise removal filter 343 performs the same processing as the noise removal filter 304 on the data group inputted from the IFFT circuit 342, and outputs the data group after the noise removal to the FFT circuit 344.

The FFT circuit 344 performs the FFT on the data group after the noise removal inputted from the noise removal filter 343 to return the data group to a signal in a frequency domain, and outputs the data group after the FFT to the carrier removal circuit 345.

The carrier removal circuit 345 removes L pieces of data from the lower end of the band and L pieces of data from the upper end of the band, from the data group after the FFT inputted from the FFT circuit 344, and outputs the data group after the data removal to the memory 205 in a latter part.

(Circuit Operation)

The following describes a circuit operation of the noise removal circuit whose circuit structure has been described, with reference to FIG. 11.

Data indicating channel characteristics of a SP signal position outputted from the complex division circuit 203 is inputted to the carrier extension circuit 341. Then, the carrier extension circuit 341 inserts L pieces of data into an outside of a lower end of a band and an outside of an upper end of the band. After that, the carrier extension circuit 341 outputs a data group composed of $2^K$ pieces of data to the IFFT circuit 303.

On the data group outputted from the carrier extension circuit 341, IFFT processing by the IFFT circuit 342, noise removal processing by the noise removal filter 343, and FFT processing by the FFT circuit 344 are performed, and the data group on which these processing have been performed is inputted to the carrier removal circuit 345.

The carrier removal circuit 345 removes L pieces of data from the lower end of the band and L pieces of data from the upper end of the band, from the data group inputted from the FFT circuit 344, and outputs the data group after the data removal to the memory 205 in a latter part.

Fourth Embodiment

The following describes a fourth embodiment of the present invention, with reference to the attached drawings.

In the noise removal circuit in FIG. 4, noise is removed from a part of data indicating channel characteristics of a SP signal position, but noise is not removed from other data.

Therefore, in the noise removal circuit in FIG. 8, noise can be removed from all of data by providing two noise removal paths.

However, it is not necessarily the case that the integer number of data are in a data group that is a target on which the IFFT or the FFT is performed. Therefore, when noise is removed, a high-frequency component that is not noise is also removed, and distortion occurs in an end portion of a signal after the FFT.

Therefore, in a noise removal circuit of the fourth embodiment, even if distortion occurs in an end portion of a signal after the FFT, the end portion in which the distortion occurs is not used in equalization of data.

<Noise Removal Circuit>

(Circuit Structure)

Figure 13:
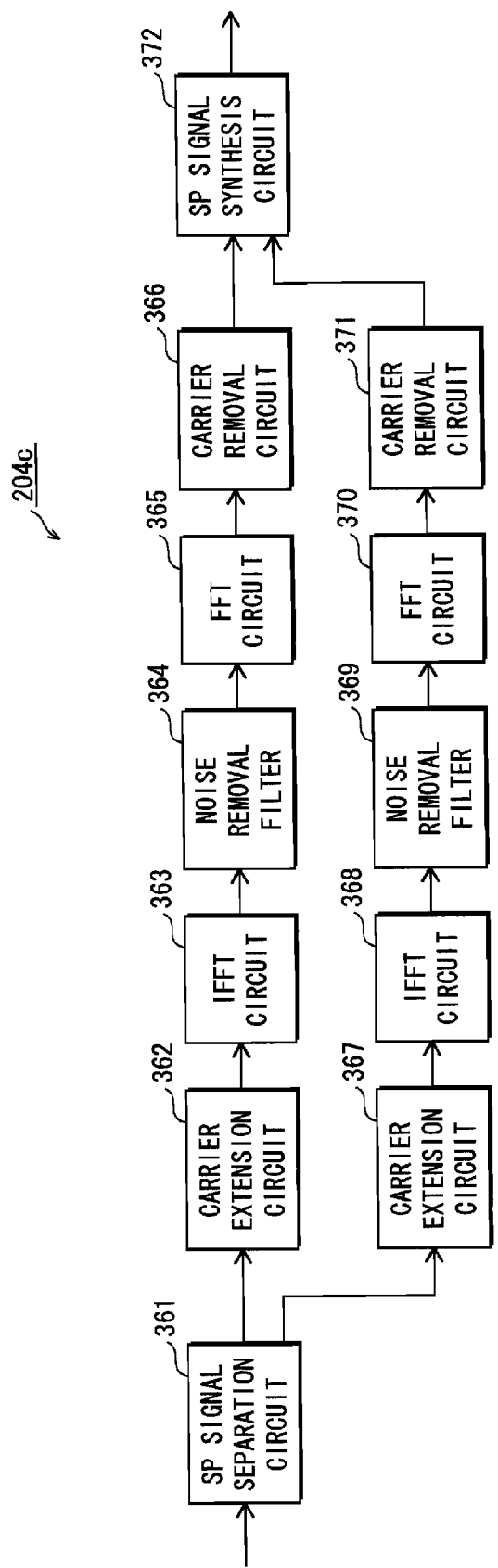
FIG. 13 is a block diagram showing a structure of a noise removal circuit of a fourth embodiment.

The following describes a structure of the noise removal circuit of the fourth embodiment, with reference to FIG. 13. FIG. 13 is a block diagram showing the structure of the noise removal circuit.

A noise removal circuit 204c includes a SP signal separation circuit 361, a carrier extension circuit 362, an IFFT circuit 363, a noise removal filter 364, a FFT circuit 365, a carrier removal circuit 366, a carrier extension circuit 367, an IFFT circuit 368, a noise removal filter 369, a FFT circuit 370, a carrier removal circuit 371, and a SP signal synthesis circuit 372.

Out of a data group composed of pieces of data each indicating channel characteristics of a SP signal position inputted from the complex division circuit 203, the SP signal separation circuit 361 outputs P (P is a positive integer) pieces of data from a lower end of a band to the carrier extension circuit 362, and outputs P pieces of data from an upper end of the band to the carrier extension circuit 367, for each symbol. Note that a value of 2P is larger than the number of data inputted from the complex division circuit 203. In other words, a part of the data outputted to the carrier extension circuit 362 is overlapped with a part of the data outputted to the carrier extension circuit 367.

The carrier extension circuit 362 extends the number of data to $2^R$ (R is a positive integer) in the following way. For a data group composed of P pieces of data inputted from the SP signal separation circuit 361, the carrier extension circuit 362 makes a copy of a value of data of the lower end to the outside of the lower end of the band to insert Q (Q is a positive integer) pieces of data having the same value as the value of the data of the lower end. Then, the carrier extension circuit 362 outputs the data group after the extension to the IFFT circuit 363.

The IFFT circuit 363 performs the IFFT on the data group composed of the $2^R$ pieces of data inputted from the carrier extension circuit 362, and outputs the data group after the IFFT to the noise removal filter 364.

The noise removal filter 364 performs the same processing as the noise removal filter 304 on the data group inputted from the IFFT circuit 363, and outputs the data group after the noise removal to the FFT circuit 365.

The FFT circuit 365 performs the FFT on the data group after the noise removal inputted from the noise removal filter 364 to return the data group to a signal in a frequency domain, and outputs the data group after the FFT to the carrier removal circuit 366.

The carrier removal circuit 366 removes Q pieces of data from the lower end of the band, from the data group after the FFT inputted from the FFT circuit 366, and outputs the data group after the data removal to the SP signal synthesis circuit 372.

The carrier extension circuit 367 extends the number of data to $2^R$ in the following way. For the data group composed of P pieces of data inputted from the SP signal separation circuit 361, the carrier extension circuit 367 makes a copy of a value of data of the upper end to the outside of the upper end of the band to insert Q pieces of data having the same value as the value of the data of the upper end. Then, the carrier extension circuit 367 outputs the data group after the extension to the IFFT circuit 368.

The IFFT circuit 368 performs the IFFT on the data group composed of the $2^R$ pieces of data inputted from the carrier extension circuit 367, and outputs the data group after the IFFT to the noise removal filter 369.

The noise removal filter 369 performs the same processing as the noise removal filter 304 on the data group inputted from the IFFT circuit 368, and outputs the data group after the noise removal to the FFT circuit 370.

The FFT circuit 370 performs the FFT on the data group after the noise removal inputted from the noise removal filter 369 to return the data group to a signal in a frequency domain, and outputs the data group after the FFT to the carrier removal circuit 371.

The carrier removal circuit 371 removes Q pieces of data from the upper end of the band, from the data group after the FFT inputted from the FFT circuit 370, and outputs the data group after the data removal to the SP signal synthesis circuit 372.

The SP signal synthesis circuit 372 selects the data inputted from the carrier removal circuit 366 from the lower end of the band to the central part of the band, for example, and selects the data inputted from the carrier removal circuit 371 from the upper end of the band to the central part of the band. Then, the SP signal synthesis circuit 372 performs switching synthesis on the selected data in the frequency domain, and outputs the data group after the synthesis to the memory 205 in a latter part.

(Circuit Operation)

The following describes a circuit operation of the noise removal circuit whose circuit structure has been described, with reference to FIG. 13.

Data indicating channel characteristics of a SP signal position outputted from the complex division circuit 203 is inputted to the SP signal separation circuit 361. Then, the SP signal separation circuit 361 outputs P pieces of data from a lower end of a band to the carrier extension circuit 362, and outputs P pieces of data from an upper end of the band to the carrier extension circuit 367.

In a data group on the lower end side of the band outputted from the SP signal separation circuit 361, Q pieces of data are inserted into an outside of the lower end of the band by the carrier extension circuit 362, and a data group composed of $2^R$ pieces of data is outputted from the carrier extension circuit 341 to the IFFT circuit 363.

On the data group outputted from the carrier extension circuit 362, IFFT processing by the IFFT circuit 363, noise removal processing by the noise removal filter 364, and FFT processing by the FFT circuit 365 are performed, and the data group on which these processing have been performed is inputted to the carrier removal circuit 366.

The carrier removal circuit 366 removes Q pieces of data from the lower end of the band, from the data group inputted from the FFT circuit 365, and outputs the data group after the data removal to the SP signal synthesis circuit 372.

In a data group on the upper end side of the band outputted from the SP signal separation circuit 361, Q pieces of data are inserted into an outside of the lower end of the band by the carrier extension circuit 367, and a data group composed of $2^R$ pieces of data is outputted from the carrier extension circuit 347 to the IFFT circuit 368.

On the data group outputted from the carrier extension circuit 362, IFFT processing by the IFFT circuit 368, noise removal processing by the noise removal filter 369, and FFT processing by the FFT circuit 370 are performed, and the data group on which these processing have been performed is inputted to the carrier removal circuit 371.

The carrier removal circuit 371 removes Q pieces of data from the upper end of the band, from the data group inputted from the FFT circuit 365, and outputs the data group after the data removal to the SP signal synthesis circuit 372.

The SP signal synthesis circuit 372 synthesizes the data inputted from the carrier removal circuit 366 and the data inputted from the carrier removal circuit 371 in a frequency domain, and outputs the data group after the synthesis to the memory 205 in a latter part.

(Concrete Example of Noise Removal Circuit)

Figure 14:
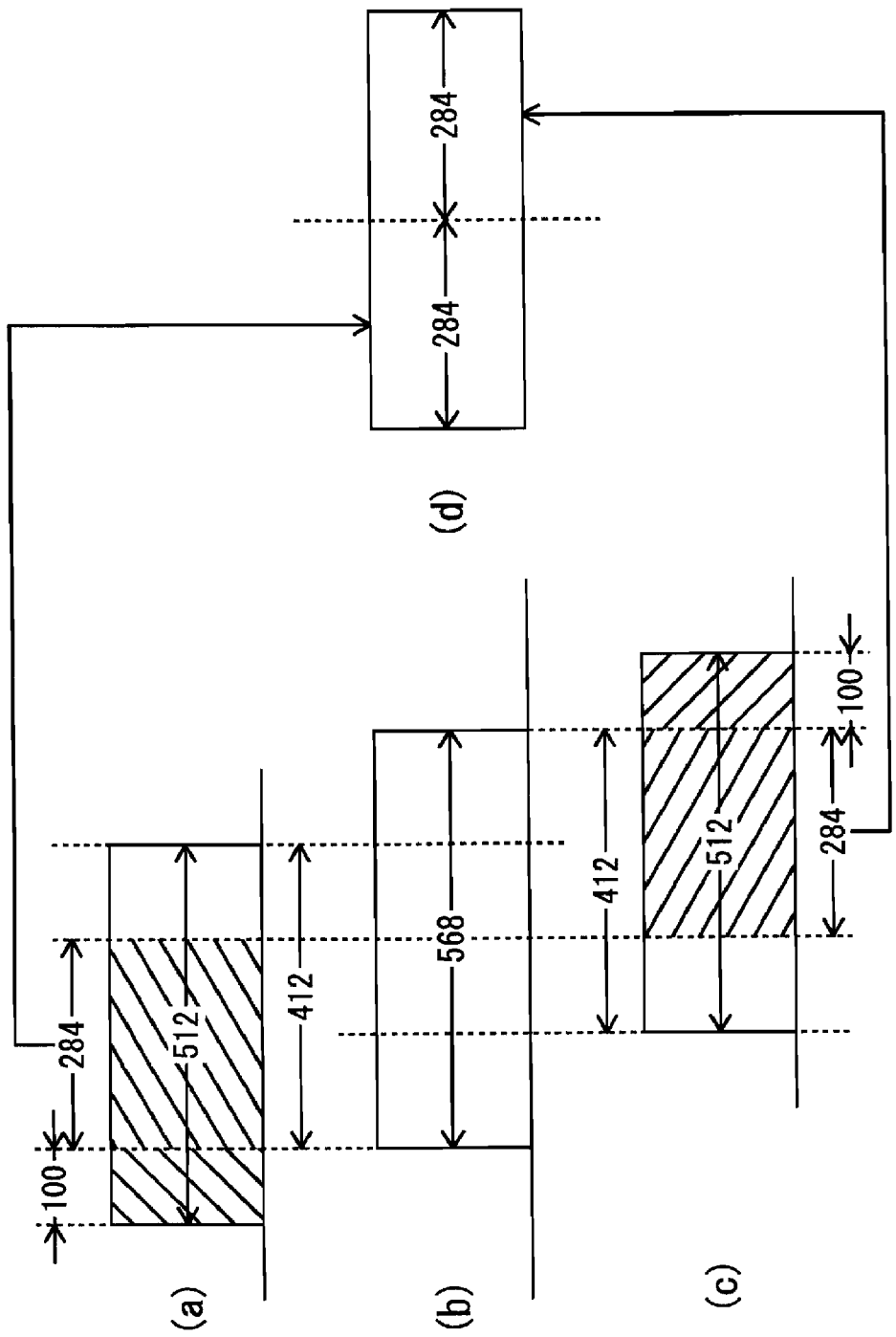
FIG. 14 describes a concrete example of the noise removal circuit in FIG. 13.
Figure 15:
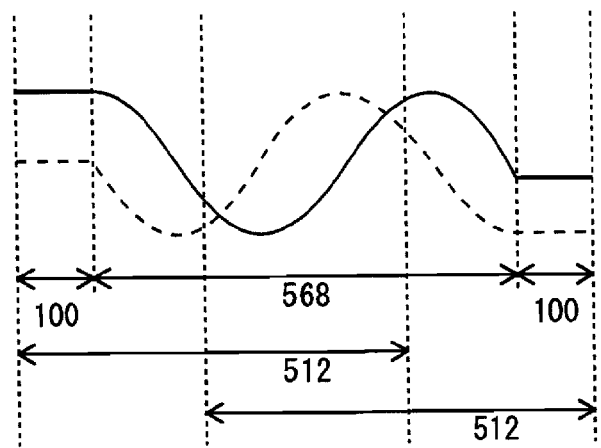
FIG. 15 describes a concrete example of the noise removal circuit in FIG. 13.

The following describes a concrete example of processing performed by the noise removal circuit 204c in FIG. 13, with reference to FIGS. 14 and 15. FIGS. 14 and 15 describe the concrete example of the processing performed by the noise removal circuit 204c in the case of the 8K mode in the DVB-T system.

FIG. 14 (b) shows 568 pieces of data indicating channel characteristics of SP signal positions.

The SP signal separation circuit 361 outputs 412 pieces of data from a lower end of a band to the carrier extension circuit 362 as shown in FIG. 14 (a), and outputs 412 pieces of data from an upper end of the band to the carrier extension circuit 367 as shown in FIG. 14 (c).

As shown in FIGS. 14 (a) and 15, the carrier extension circuit 362 extends the number of data to 512 (=$2^9$) in the following way. For the data inputted from the SP signal separation circuit 361, the carrier extension circuit 362 inserts 100 pieces of data, that is same as the value of data of the lower end, into an outside of the lower end of the band. Then, the carrier extension circuit 362 outputs the data after the extension to the IFFT circuit 363.

On 512 pieces of data outputted from the carrier extension circuit 362, IFFT processing by the IFFT circuit 363, noise removal processing by the noise removal filter 364, and FFT processing by the FFT circuit 365 are performed, and the data on which these processing have been performed is inputted to the carrier removal circuit 366.

The carrier removal circuit 366 removes 100 pieces of data from the lower end of the band, from the data group inputted from the FFT circuit 365, and outputs the data group after the data removal to the SP signal synthesis circuit 372.

As shown in FIGS. 14 (c) and 15, the carrier extension circuit 367 extends the number of data to 512 in the following way. For the data inputted from the SP signal separation circuit 361, the carrier extension circuit 367 inserts 100 pieces of data, that is same as the value of data of the upper end, into an outside of the upper end of the band. Then, the carrier extension circuit 367 outputs the data after the extension to the IFFT circuit 368.

On 512 pieces of data outputted from the carrier extension circuit 367, IFFT processing by the IFFT circuit 368, noise removal processing by the noise removal filter 369, and FFT processing by the FFT circuit 370 are performed, and the data on which these processing have been performed is inputted to the carrier removal circuit 371.

The carrier removal circuit 371 removes 100 pieces of data from the upper end of the band, from the data group inputted from the FFT circuit 370, and outputs the data group after the data removal to the SP signal synthesis circuit 372.

The SP signal synthesis circuit 372 selects the data inputted from the carrier removal circuit 366 as 284 pieces of data from the lower end of the band to the central part of the band as shown in FIGS. 14 (a) and 14 (d), and selects the data inputted from the carrier removal circuit 371 as 284 pieces of data from the upper end of the band to the central part of the band as shown in FIGS. 14 (c) and 14 (d). Then, the SP signal synthesis circuit 372 performs switching synthesis on the selected data in a frequency domain, and outputs the data group after the synthesis to the memory 205 in a latter part.

Figure 16:
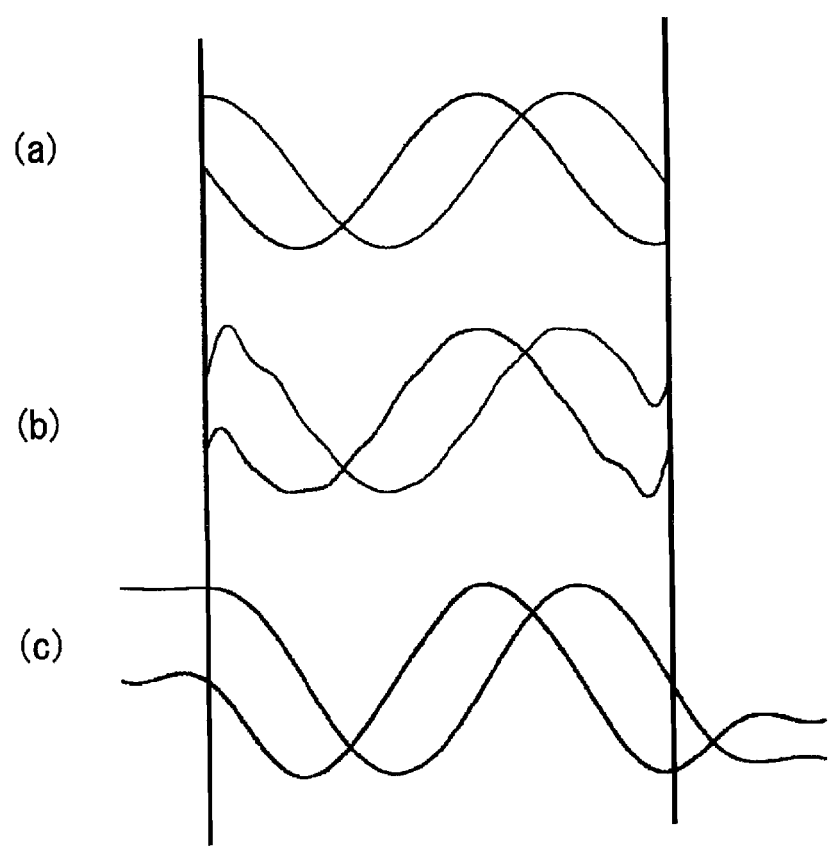
FIG. 16 shows a result of a noise removal by the noise removal circuit in FIG. 13.

FIG. 16 shows an example in which noise has been removed in the case of the above concrete example. FIG. 16 (a) shows channel characteristics when there is no noise, FIG. 16 (b) shows channel characteristics when the noise removal processing of the second embodiment is performed, and FIG. 16 (c) shows channel characteristics when noise removal processing is performed. It can be found that little distortion occurs in the central part of the band although some distortion occurs in the end part of the band.

Fifth Embodiment

The following describes a fifth embodiment of the present invention, with reference to the attached drawings.

In the noise removal circuit in FIG. 13, if a large threshold value of noise removal processing is taken in the case of QPSK, there is a possibility that distortion of a signal after the FFT becomes large, and accuracy of mapping of data is reduced because of discontinuity in a central part of a band that is synthesized by a SP signal synthesis unit.

Therefore, a noise removal circuit of the fifth embodiment tries to remove a high-frequency component from an output signal in order to prevent the discontinuity in the central part of the band of the output signal in the SP signal synthesis unit.

<Noise Removal Circuit>

Figure 17:
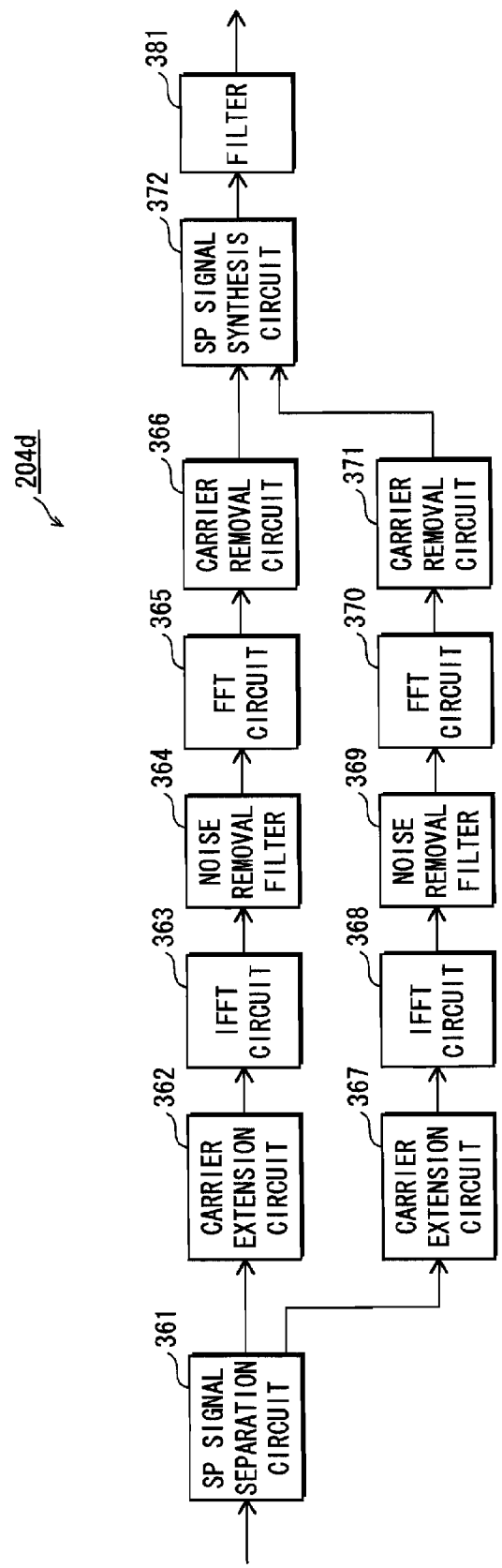
FIG. 17 is a block diagram showing a structure of a noise removal circuit of a fifth embodiment.

The following describes a structure of the noise removal circuit of the fifth embodiment, with reference to FIG. 17. FIG. 17 is a block diagram showing the structure of the noise removal circuit.

A noise removal circuit 204d includes the SP signal separation circuit 361, the carrier extension circuit 362, the IFFT circuit 363, the noise removal filter 364, the FFT circuit 365, the carrier removal circuit 366, the carrier extension circuit 367, the IFFT circuit 368, the noise removal filter 369, the FFT circuit 370, the carrier removal circuit 371, the SP signal synthesis circuit 372, and a filter 381.

The filter 381 is composed of the LPF, for example, performs filtering processing in a frequency direction on an output signal of the SP signal synthesis circuit 372, and outputs the signal after the filtering processing to the memory 205 in a latter part. Note that instead of normal filtering processing in a frequency direction, weighted average processing and the like can be performed in accordance with a carrier position in a central part of a band.

Sixth Embodiment

The following describes a sixth embodiment of the present invention, with reference to the attached drawings.

In the case of the mode 3 in the ISDB-T system of 1 segment receiver, the number of all of carriers is 432, and the number of SP signals is 36. If the number of data used when noise is removed is small, it is difficult to remove noise. Therefore, an equalization circuit of the sixth embodiment increases the number of data used in noise removal processing by using data that has been interpolated in the symbol direction and the carrier direction in the noise removal processing.

<Equalization Circuit>

(Circuit Structure)

Figure 18:
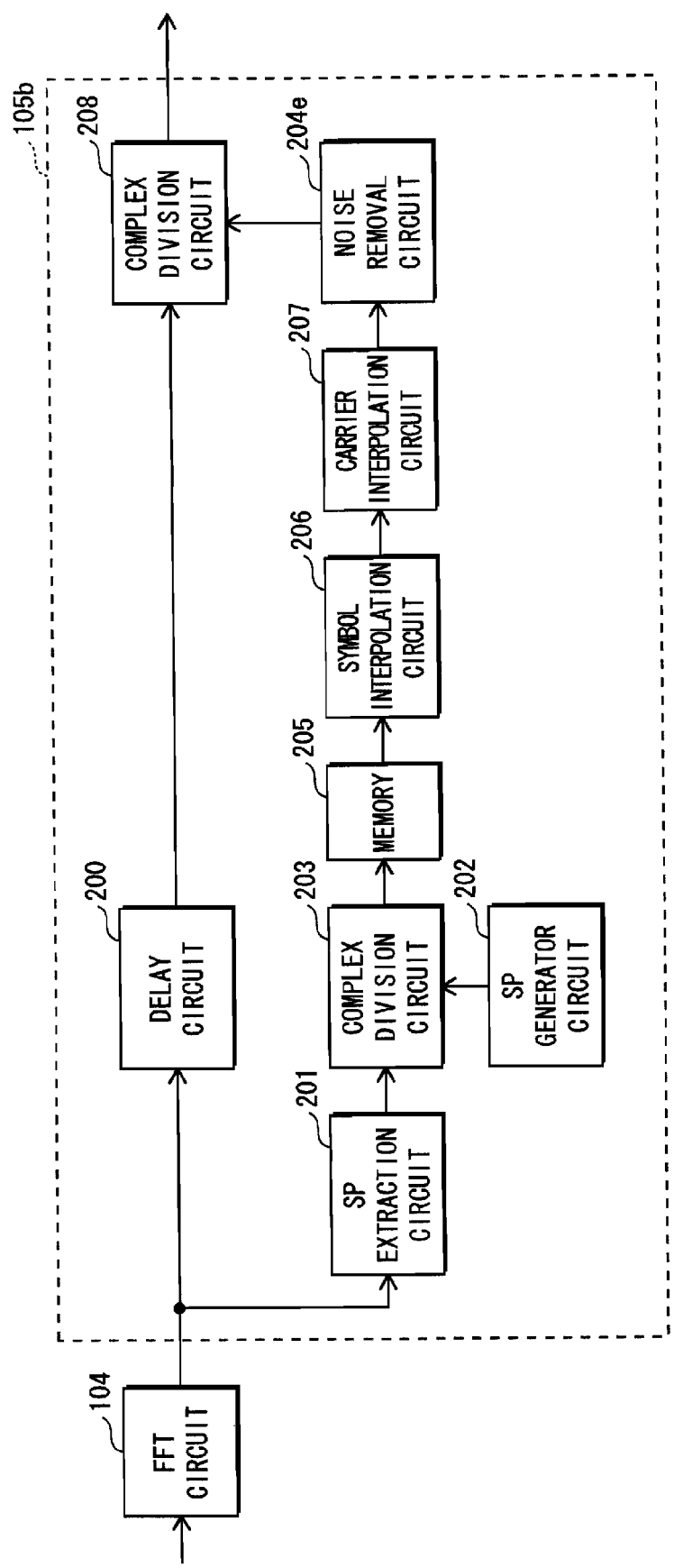
FIG. 18 is a block diagram showing a structure of an equalization circuit of a sixth embodiment.

The following describes a structure of the equalization circuit of the sixth embodiment, with reference to FIG. 18. FIG. 18 is a block diagram showing the structure of the equalization circuit.

An equalization circuit 105b includes the delay circuit 200, the SP extraction circuit 201, the SP generator circuit 202, the complex division circuit 203, the memory 205, the symbol interpolation circuit 206, the carrier interpolation circuit 207, a noise removal circuit 204e, and the complex division circuit 208.

The noise removal circuit 204e performs noise removal processing using data indicating channel characteristics for all of carriers inputted from the carrier interpolation circuit 207, and outputs the data indicating the channel characteristics after the noise removal to the complex division circuit 208.

The noise removal circuits in FIGS. 4, 8, 11, 13, and 17 can be used as the noise removal circuit 204e, by composing the noise removal circuits so that the data outputted from the carrier interpolation circuit 207 is used instead of the data outputted from the complex division circuit 203.

(Circuit Operation)

The following describes a circuit operation of the equalization circuit 105b whose circuit structure has been described, with reference to FIG. 18.

A signal after the FFT performed by the FFT circuit 104 is inputted to the delay circuit 200 and the SP extraction circuit 201 from the FFT circuit 104.

The SP extraction circuit 201 extracts a SP signal from the signal after the FFT, and the SP signal extracted by the SP extraction circuit 201 is inputted to the complex division circuit 203. At this time, the SP generator circuit 202 outputs a same signal as a SP signal at the time of transmission by a transmitter to the complex division circuit 203. The complex division circuit 203 performs complex division on the SP signal inputted from the SP extraction circuit 201 by the signal inputted from the SP generator circuit 202 to calculate data indicating channel characteristics of a SP signal position. Then, a result of the calculation is stored in the memory 205.

When the predetermined number of data indicating channel characteristics are stored in the memory 205, the symbol interpolation circuit 206 performs interpolation processing on a data group composed of pieces of data indicating channel characteristics of SP signal positions in the symbol direction. Then, the carrier interpolation circuit 207 performs interpolation processing on the data group inputted from the symbol interpolation circuit 206 in the carrier direction to calculate data indicating channel characteristics for all of sub carriers. Then, the carrier interpolation circuit 207 outputs a result of the calculation to the noise removal circuit 204e.

The noise removal circuit 204e removes noise from the data indicating the channel characteristics for all of sub carriers inputted from the carrier interpolation circuit 207, and outputs the data after the noise removal to the complex division circuit 208.

A data signal and the like outputted from the FFT circuit 104 are delayed by the delay circuit 200, and inputted to the complex division circuit 208.

The complex division circuit 208 performs complex division on the data signal and the like by data indicating channel characteristics of a signal position of the data signal and the like inputted from the noise removal circuit 204e, and outputs a result of the complex division to the frequency de-interleaver circuit 106 in a latter part.

Seventh Embodiment

The following describes a seventh embodiment of the present invention, with reference to the attached drawings.

If the number of data used when noise is removed is small, it is difficult to remove noise. Therefore, an equalization circuit of the seventh embodiment increases the number of data used in noise removal processing by using data that has been interpolated in the symbol direction in the noise removal processing.

<Equalization Circuit>

(Circuit Structure)

Figure 19:
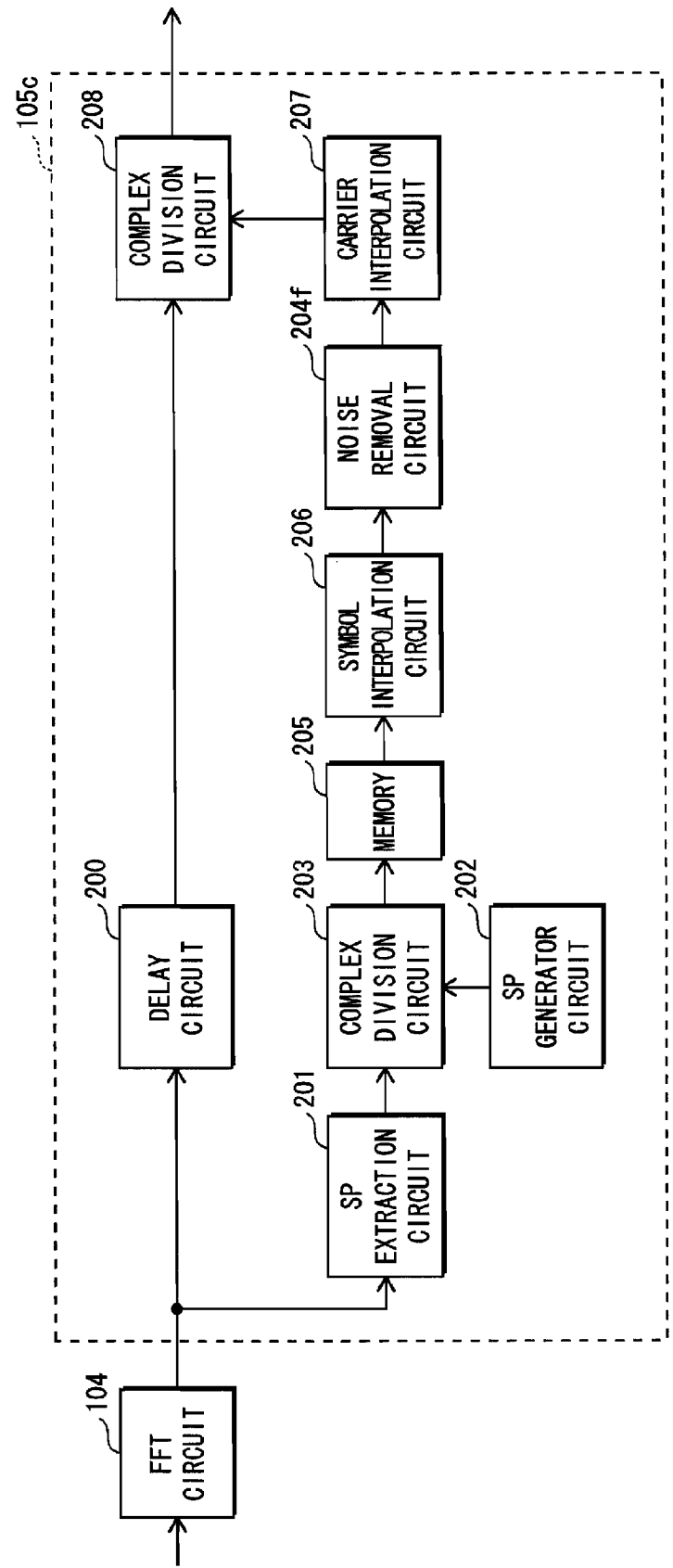
FIG. 19 is a block diagram showing a structure of an equalization circuit of a seventh embodiment.

The following describes a structure of the equalization circuit of the seventh embodiment, with reference to FIG. 19. FIG. 19 is a block diagram showing the structure of the equalization circuit.

An equalization circuit 105c includes the delay circuit 200, the SP extraction circuit 201, the SP generator circuit 202, the complex division circuit 203, the memory 205, the symbol interpolation circuit 206, a noise removal circuit 204f, the carrier interpolation circuit 207, and the complex division circuit 208.

The noise removal circuit 204f performs noise removal processing using data indicating channel characteristics of each signal position of a SP carrier (sub carrier in which a SP signal is inserted at any of symbols) inputted from the symbol interpolation circuit 206, and outputs the data indicating the channel characteristics after the noise removal to the carrier interpolation circuit 207.

The noise removal circuits in FIGS. 4, 8, 11, 13, and 17 can be used as the noise removal circuit 204f, by composing the noise removal circuits so that the data outputted from the symbol interpolation circuit 206 is used instead of the data outputted from the complex division circuit 203.

(Circuit Operation)

The following describes a circuit operation of the equalization circuit 105c whose circuit structure has been described, with reference to FIG. 19.

A signal after the FFT performed by the FFT circuit 104 is inputted to the delay circuit 200 and the SP extraction circuit 201 from the FFT circuit 104.

The SP extraction circuit 201 extracts a SP signal from the signal after the FFT, and the SP signal extracted by the SP extraction circuit 201 is inputted to the complex division circuit 203. At this time, the SP generator circuit 202 outputs a same signal as a SP signal at the time of transmission by a transmitter to the complex division circuit 203. The complex division circuit 203 performs complex division on the SP signal inputted from the SP extraction circuit 201 by the signal inputted from the SP generator circuit 202 to calculate data indicating channel characteristics of the SP signal position. Then, a result of the calculation is stored in the memory 205.

When the predetermined number of data indicating channel characteristics are stored in the memory 205, the symbol interpolation circuit 206 performs interpolation processing on a data group composed of pieces of data indicating channel characteristics of SP signal positions in the symbol direction to calculate data indicating channel characteristics of each of signal positions of a SP carrier. Then, the symbol interpolation circuit 206 outputs a result of the calculation to the noise removal circuit 204f.

The noise removal circuit 204f removes noise from the data indicating the channel characteristics of each of the signal positions of the SP carrier inputted from the symbol interpolation circuit 206, and outputs the data after the noise removal to the carrier interpolation circuit 207. Then, the carrier interpolation circuit 207 performs interpolation processing on the inputted data group in the carrier direction to calculate data indicating channel characteristics for all of sub carriers, and outputs a result of the calculation to the complex division circuit 208.

A data signal and the like outputted from the FFT circuit 104 are delayed by the delay circuit 200, and inputted to the complex division circuit 208.

The complex division circuit 208 performs complex division on the data signal and the like by the data indicating channel characteristics of a signal position of the data signal and the like inputted from the carrier interpolation circuit 207, and outputs a result of the complex division to the frequency de-interleaver circuit 106 in a latter part.

Note that although a detail will not be described here, the present invention may have the following construction. If C/N, which is monitored by a receiver having a C/N function, is equal to or larger than a predetermined value, the noise removal processing of the present invention is not performed.

<<Supplement>>
(1) In the first embodiment, the SP signal separation circuit 301 separates the data group composed of the pieces of data indicating the channel characteristics into $2^N$ pieces of data in the central part of the band and the other data. However, the present invention is not limited to this construction, and may have the following construction. For example, the data group may be separated into $2^N$ pieces of data in the lower part of the band and the other data, or $2^N$ pieces of data in the upper part of the band and the other data.

(2) In each of the embodiments, the noise removal filter sets a value of a sample point to zero if a power value of the sample point is equal to or smaller than a value that is determined by a predetermined procedure. However, the present invention is not limited to this construction, and may have the following construction. The value of the sample point may be set to equal to or smaller than a value that is determined by a predetermined procedure, or the value of the sample point may be set to a value obtained by multiplying the value of the sample point by a predetermined ratio (value smaller than 1).

(3) In each of the embodiments, the noise removal filter uses a value obtained by subtracting a predetermined threshold value from the power value of the principal wave as a reference. However, the present invention is not limited to this construction, and may have the following construction. The noise removal filter may use a value obtained by multiplying the power value of the principal wave by a predetermined ratio as a reference, or a predetermined value as a reference.

(4) In the second and fourth embodiments, the number of data outputted from the SP signal separation circuit 321 (SP signal separation circuit 361) to the IFFT circuit 322 (carrier extension circuit 362) and the number of data outputted from the SP signal separation circuit 321 (SP signal separation circuit 361) to the IFFT circuit 325 (carrier extension circuit 367) are same. However, it is not required that the numbers are same. Note that in this case, a delay circuit is provided so that data in a same symbol is inputted to the SP signal synthesis circuit 328.

(5) In the second and fourth embodiments, the SP signal synthesis circuit 328 (SP signal synthesis circuit 372) selects any of the data inputted from the FFT circuit 324 (carrier removal circuit 366) and the data inputted from the FFT circuit 327 (carrier removal circuit 371), and performs switching synthesis in a frequency domain. However, the present invention is not limited to this construction, and may have the construction in which a value of data of the overlapped band may be set to a weighted average value of both of data.

(6) In the third embodiment, the carrier extension circuit 341 inserts the same number of data into each of the outside of the lower end of the band and the outside of the upper end of the band. However, the present invention is not limited to this construction, and may have the construction in which the different number of data may be inserted into each of the outside of the lower end of the band and the outside of the upper end of the band.

Also, in the fourth embodiment, the number of data inserted into the outside of the lower end of the band by the carrier extension circuit 362 and the number of data inserted into the outside of the upper end of the band by the carrier extension circuit 367 are same. However, the present invention is not limited to this construction, and may have the construction in which the different number of data may be inserted into each of the outside of the lower end of the band and the outside of the upper end of the band.

(7) In the third and fourth embodiments, the carrier extension circuits 341, 362, and 367 insert the data having the same value as the value of the data in the end portion into the outside of the lower end of the band, or the outside of the upper end of the band. However, the present invention is not limited to this construction, and may have the construction in which data having a value within a range of a predetermined ratio is inserted into the value of the data in the end portion. Also, when the value of the data in the end portion is compared with a value of inner data adjacent to the data in the end portion, if the value of the data in the end portion is larger than the value of the inner data, the data may be inserted so that the farther from the end portion, the larger the value of data, and if the value of the data in the end portion is smaller than the value of the inner data, the data may be inserted so that the farther from the end portion, the smaller the value of data.

(8) In the fourth embodiment, each of the carrier extension circuit 362 and the carrier extension circuit 367 inserts the data into the data group outputted from the SP signal separation circuit 361. However, the present invention is not limited to this construction, and may have the following construction. The carrier extension circuit inserts the data into the data group outputted from the complex division circuit 203, and the SP signal separation circuit separates the data group after inserting the data.

Moreover, the carrier removal circuit 366 and the carrier removal circuit 371 remove noise from signals inputted from the FFT circuit 365 and the FFT circuit 370 respectively. However, the present invention is not limited to this construction, and may have the following construction. The data group outputted from the FFT circuit 365 and the data group outputted from the FFT circuit 370 are synthesized in a frequency domain, and the carrier removal circuit removes the data inserted by the carrier extension circuit from the data group after the synthesis.

(9) In the latter part of the SP signal synthesis circuit 328 of the noise removal circuit described in the second embodiment, the filter 381 described in the fifth embodiment may be added.

(10) The receiver in each of the embodiments may be typically realized as LSI (Large Scale Integration) that is an integrated circuit. Each of the circuits may individually be one chip, or one chip is realized so as to include all of the circuits or a part of the circuits. For example, the tuner 101 may be integrated in the same integrated circuit as other circuits, or may be other integrated circuit.

Although it is mentioned as LSI here, it is also referred to as IC (Integrated Circuit), system LSI, super LSI, or ultra LSI, in accordance with an integration degree.

Also, the method of integrating the circuit is not limited to LSI, and a dedicated circuit, or a general-purpose processor may be used. FPGA (Field Programmable Gate Array) that can be programmed after manufacturing LSI, and a reconfigurable processor that can reconfigure the connection and the setting of the circuit cell in LSI may be used.

Furthermore, if a new technology of integrating the circuit instead of LSI is developed by the progress of a semiconductor technology or the other technology derived from the semiconductor technology, it is a matter of course that a functional block is integrated by using the new technology. The adaptation of biotechnology can be considered as the possibility.

INDUSTRIAL APPLICABILITY

The present invention can be used in a fixed DVD receiver, a portable DVT receiver, a STB (Set Top Box), demodulation LSI and the like for receiving and decoding an OFDM signal that is used in digital broadcasting in the OFDM transmission system.

The invention claimed is:

1. A receiver for equalizing data signals included in an OFDM signal based on scattered pilot signals that are inserted in a predetermined sub carrier of the OFDM signal, the receiver comprising:
    a carrier extension unit operable to insert one or more pieces of data into an outside of a lower end of a band in a data group based on a value of a piece of data of the lower end, and insert one or more pieces of data into an outside of an upper end of the band based on a value of a piece of data of the upper end, the data group being composed of pieces of data indicating channel characteristics that are obtained based on the scattered pilot signals and included in a same symbol;
    an inverse Fourier transform unit operable to perform an inverse fast Fourier transform on a data group composed of $2^N$ pieces of data including the pieces of data inserted by the carrier extension unit, N being a positive integer;
    a noise removal unit operable to perform noise removal processing on a data group obtained as a result of the inverse fast Fourier transform by the inverse Fourier transform unit, by making smaller a value of a piece of data, in the obtained data group, that is no larger than a value determined by a predetermined procedure;
    a Fourier transform unit operable to perform a fast Fourier transform on a data group obtained as a result of the noise removal processing by the noise removal unit; and
    an equalization unit operable to equalize the data signals based on a data group obtained as a result of the fast Fourier transform by the Fourier transform unit.

2. The receiver of claim 1, wherein
the inverse Fourier transform unit includes:
    a first inverse Fourier transform unit operable to perform the inverse fast Fourier transform on a data group including $2^{N1}$ pieces of data from a lower end of a band after the data has been inserted by the carrier extension unit, N1 being a positive integer; and
    a second inverse Fourier transform unit operable to perform the inverse fast Fourier transform on a data group that partly overlaps the data group that is subject to the inverse fast Fourier transform by the first inverse Fourier transform unit, and includes $2^{N2}$ pieces of data from an upper end of the band after the data has been inserted by the carrier extension unit, N2 being a positive integer,
the noise removal unit performs the noise removal processing on a data group obtained as a result of the inverse fast Fourier transform by the first inverse Fourier transform unit and a data group obtained as a result of the inverse fast Fourier transform by the second inverse Fourier transform unit,
the Fourier transform unit includes:
    a first Fourier transform unit operable to perform the fast Fourier transform on a data group that is obtained as a result of the inverse fast Fourier transform by the first inverse Fourier transform unit, and is then processed by the noise removal unit; and
    a second Fourier transform unit operable to perform the fast Fourier transform on a data group that is obtained as a result of the inverse fast Fourier transform by the second inverse Fourier transform unit, and is then processed by the noise removal unit,
the receiver further comprises:
    a synthesis unit operable to synthesize a data group obtained as a result of the fast Fourier transform by the first Fourier transform unit and a data group obtained as a result of the fast Fourier transform by the second Fourier transform unit, and
the equalization unit equalizes the data signals based on pieces of data included in a data group obtained as a result of the synthesis by the synthesis unit.

3. The receiver of claim 2, wherein
the synthesis unit selects pieces of data included in the data group obtained as a result of the fast Fourier transform by the first Fourier transform unit in a band having a frequency no higher than a predetermined frequency of a band in which the data group obtained as a result of the fast Fourier transform by the first Fourier transform unit overlaps the data group obtained as a result of the fast Fourier transform by the second Fourier transform unit, and selects pieces of data included in the data group obtained as a result of the fast Fourier transform by the second Fourier transform unit in a band having a frequency higher than the predetermined frequency, to perform switching synthesis on the data group obtained as a result of the fast Fourier transform by the first Fourier transform unit and the data group obtained as a result of the fast Fourier transform by the second Fourier transform unit.

4. The receiver of claim 1, wherein
the carrier extension unit inserts one or more pieces of data each having a same value as the value of the piece of data of the lower end to perform the inserting of the one or more pieces of data into the outside of the lower end of the band, and inserts one or more pieces of data each having a same value as the value of the piece of data of the upper end to perform the inserting of the one or more pieces of data into the outside of the upper end of the band.

5. The receiver of claim 1, wherein
the noise removal unit sets the value that is no larger than the value determined by the predetermined procedure at zero.

6. The receiver of claim 1, further comprising:
a division unit operable to perform division on the scattered pilot signals by a scattered pilot signal at a time of transmission by a transmission side, wherein
the carrier extension unit inserts the one or more pieces of data into a data group composed of a result of the division by the division unit.

7. The receiver of claim 1, further comprising:
a division unit operable to perform division on the scattered pilot signals by a scattered pilot signal at a time of transmission by a transmission side; and
a symbol interpolation unit operable to perform interpolation processing based on a result of the division by the division unit in a symbol direction, to calculate the pieces of data indicating the channel characteristics of each of signal positions in the sub carrier in which the scattered pilot signals are inserted, wherein
the carrier extension unit inserts the one or more pieces of data into a data group composed of a result of the interpolation processing by the symbol interpolation unit.

8. The receiver of claim 1, further comprising:
a division unit operable to perform division on the scattered pilot signals by a scattered pilot signal at a time of transmission by a transmission side; and
an interpolation unit operable to perform interpolation processing based on a result of the division by the division unit in a symbol direction and a carrier direction, to calculate pieces of data indicating channel characteristics for all of sub carriers, wherein the carrier extension unit inserts the one or more pieces of data into a data group composed of a result of the calculation by the interpolation unit.

9. A receiver for equalizing data signals included in an OFDM signal based on scattered pilot signals that are inserted in a predetermined sub carrier of the OFDM signal, the receiver comprising:

a division unit operable to perform division on the scattered pilot signals by a scattered pilot signal at a time of transmission by a transmission side;

an inverse Fourier transform unit operable to perform an inverse fast Fourier transform on a data group composed of $2^N$ pieces of data in a same symbol that are a part of a result of the division by the division unit, N being a positive integer;

a noise removal unit operable to perform noise removal processing on a data group obtained as a result of the inverse fast Fourier transform by the inverse Fourier transform unit, by making smaller a value of a piece of data, in the obtained data group, that is no larger than a value determined by a predetermined procedure;

a Fourier transform unit operable to perform a fast Fourier transform on a data group obtained as a result of the noise removal processing by the noise removal unit;

an interpolation unit operable to perform interpolation processing on a data group composed of pieces of data excluding the $2^N$ pieces of data, and pieces of data transformed by the Fourier transform unit in a symbol direction and a carrier direction, to calculate pieces of data indicating channel characteristics for all of sub carriers; and an equalization unit operable to equalize the data signals based on a data group obtained as a result of the interpolation processing by the interpolation unit.

10. An integrated circuit for equalizing data signals included in an OFDM signal based on scattered pilot signals that are inserted in a predetermined sub carrier of the OFDM signal, the integrated circuit comprising:

a carrier extension circuit that inserts one or more pieces of data into an outside of a lower end of a band in a data group based on a value of a piece of data of the lower end, and inserts one or more pieces of data into an outside of an upper end of the band based on a value of a piece of data of the upper end, the data group being composed of pieces of data indicating channel characteristics that are obtained based on the scattered pilot signals and included in a same symbol;

an inverse Fourier transform circuit that performs an inverse fast Fourier transform on a data group composed of $2^N$ pieces of data including the pieces of data inserted by the carrier extension circuit, N being a positive integer;

a noise removal circuit that performs noise removal processing on a data group obtained as a result of the inverse fast Fourier transform by the inverse Fourier transform circuit, by making smaller a value of a piece of data, in the obtained data group, that is no larger than a value determined by a predetermined procedure;

a Fourier transform circuit that performs a fast Fourier transform on a data group obtained as a result of the noise removal processing by the noise removal circuit; and an equalization circuit that equalizes the data signals based on a data group obtained as a result of the fast Fourier transform by the Fourier transform circuit.

11. A receiving method for equalizing data signals included in an OFDM signal based on scattered pilot signals that are inserted in a predetermined sub carrier of the OFDM signal, the receiving method comprising:

a carrier extension step of inserting one or more pieces of data into an outside of a lower end of a band in a data group based on a value of a piece of data of the lower end, and inserting one or more pieces of data into an outside of an upper end of the band based on a value of a piece of data of the upper end, the data group being composed of pieces of data indicating channel characteristics that are obtained based on the scattered pilot signals and included in a same symbol;

an inverse Fourier transform step of performing an inverse fast Fourier transform on a data group composed of $2^N$ pieces of data including the pieces of data inserted by the carrier extension step, N being a positive integer;

a noise removal step of performing noise removal processing on a data group obtained as a result of the inverse fast Fourier transform by the inverse Fourier transform step, by making smaller a value of a piece of data, in the obtained data group, that is no larger than a value determined by a predetermined procedure;

a Fourier transform step of performing a fast Fourier transform on a data group obtained as a result of the noise removal processing by the noise removal step; and an equalization step of equalizing the data signals based on a data group obtained as a result of the fast Fourier transform by the Fourier transform step.

* * * * *